United States Patent  
Rai et al.

(10) Patent No.: US 8,819,735 B2  
(45) Date of Patent: Aug. 26, 2014

(54) PRESENTING CONTENT

(75) Inventors: Pete Rai, Egham (GB); Colin John Davies, Fordingbridge (GB); Simon John Parnall, Kingswood (GB); Ian Bastable, Fareham (GB); Kevin Murray, Fordingbridge (GB); Peter Gibbs, Winchester (GB); Miles Davis, Whitton (GB); James Geoffrey Walker, Winchester (GB); Ray Taylor, Hook (GB)

(73) Assignee: Cisco Technology Inc., San Jose, CA (US)

( * ) Notice: Subject to any disclaimer, the term of this patent is extended or adjusted under 35 U.S.C. 154(b) by 893 days.

(21) Appl. No.: 12/452,158

(22) PCT Filed: Jun. 25, 2008

(86) PCT No.: PCT/IB2008/052543  
§ 371 (c)(1),  
(2), (4) Date: Feb. 12, 2010

(87) PCT Pub. No.: WO2009/001307  
PCT Pub. Date: Dec. 31, 2008

(65) Prior Publication Data  
US 2010/0138865 A1 Jun. 3, 2010

Related U.S. Application Data

(60) Provisional application No. 60/937,174, filed on Jun. 26, 2007.

(51) Int. Cl.  
*H04N 5/445* (2011.01)  
*G06F 3/00* (2006.01)  
(Continued)

(52) U.S. Cl.  
CPC .......... *H04N 7/16* (2013.01); *H04N 21/47202* (2013.01); *H04N 21/478* (2013.01); *H04N 21/25891* (2013.01); *H04N 21/4312* (2013.01); *H04N 21/6582* (2013.01); *H04N 21/454* (2013.01); *H04N 21/4314* (2013.01); *H04N 21/482* (2013.01); *H04N 7/17318* (2013.01); *H04N 21/4532* (2013.01)  
USPC .................... 725/44; 725/39; 725/46; 725/58

(58) Field of Classification Search  
CPC ..... H04N 21/25; H04N 21/251; H04N 21/45; H04N 21/466; H04N 21/4668; H04N 21/4756  
USPC ............. 725/9, 14, 37, 39, 44, 46, 50, 58, 61  
See application file for complete search history.

(56) References Cited

U.S. PATENT DOCUMENTS 5,410,344 A 4/1995 Graves et al.  
(Continued)

FOREIGN PATENT DOCUMENTS

WO WO 01/47249 A2 6/2001  
(Continued)

OTHER PUBLICATIONS www.xfm.co.uk/els/mi-xfm.asp (Mar. 13, 2007).

*Primary Examiner* — Hai V Tran  
(74) *Attorney, Agent, or Firm* — Husch Blackwell LLP

(57) ABSTRACT

A method of presenting content to a viewer is described. The method includes: receiving a schedule of content at a client operable by the viewer, the schedule of content including a directed graph, the directed graph including a plurality of nodes, wherein each node in the plurality of nodes is connected to one or more other nodes in the plurality of nodes by one or more paths, wherein each path represents content presentable to the viewer; traversing the directed graph by following a route between nodes and along paths of the directed graph, wherein at each node the client determines a path to follow according to state information accessible by the client; and presenting content to the viewer as each path is followed.

15 Claims, 8 Drawing Sheets

(51) Int. Cl.
  *G06F 13/00* (2006.01)
  *H04N 21/472* (2011.01)
  *H04N 21/258* (2011.01)
  *H04N 7/16* (2011.01)
  *H04N 21/431* (2011.01)
  *H04N 21/658* (2011.01)
  *H04N 21/454* (2011.01)
  *H04N 21/482* (2011.01)
  *H04N 7/173* (2011.01)
  *H04N 21/45* (2011.01)
  *H04N 21/478* (2011.01)

(56) References Cited

U.S. PATENT DOCUMENTS

| | | |
|---|---|---|
| 5,760,821 A | 6/1998 | Ellis et al. |
| 5,867,799 A | 2/1999 | Lang et al. |
| 6,727,914 B1 * | 4/2004 | Gutta ............................... 725/46 |
| 6,810,527 B1 | 10/2004 | Conrad et al. |
| 6,851,090 B1 * | 2/2005 | Gutta et al. .................... 715/716 |
| 7,007,294 B1 * | 2/2006 | Kurapati .......................... 725/53 |
| 8,156,118 B2 * | 4/2012 | Kalasapur et al. ............. 707/733 |
| 2007/0157237 A1 * | 7/2007 | Cordray et al. ................. 725/42 |

FOREIGN PATENT DOCUMENTS

| | | |
|---|---|---|
| WO | WO 01/60063 A2 | 8/2001 |
| WO | WO 03/104940 A2 | 12/2003 |
| WO | WO 2005/055092 A2 | 6/2005 |

\* cited by examiner

PRESENTING CONTENT

The present application is a 35 USC §371 application of PCT/IB2008/052543, filed on 25 Jun. 2008 and entitled "Presenting Content", which was published on 31 Dec. 2008 in the English language with International Publication Number WO 2009/001307 A1, and which relies for priority on U.S. Provisional Patent Application Ser. No. 60/937,174, filed on 26 Jun. 2007.

FIELD OF THE INVENTION

The present invention relates to methods of and devices for presenting content to a viewer.

BACKGROUND OF THE INVENTION

Today, media consumers are presented with a vast number of television channels from where media content can be consumed. Television channels are traditionally broadcast and all media consumers that are entitled to receive the television channels are presented with the same schedule of television content. In addition, a vast amount of content is available as part of Video on demand (VOD) systems that allow users to select and watch content over a network as part of an interactive television system. VOD systems either "stream" content, whereby a user selects some content and it begins to play on the television set almost instantaneously, or make it available to users via "download", where users download the content in its entirety to a set-top box before viewing can start.

XFM (www.xfm.co.uk/els/mi-xfm.asp) offers a branded radio/music service, which adapts to listeners' preferences through user interaction. A listener is presented with a music player that allows him/her to select from a limited range of genre based (branded) music channels. To alter the composition of the channel, the listener can optionally offer a personal rating (from 'never again' to a 'strong preference') for a track or the track's artist while a track is playing. The listener may also skip to the end of a track (up to a maximum of 6 tracks per hour) without affecting the channel content. In the absence of listener input/feedback the channel continues to play in the manner of a conventional radio service.

International patent application published as WO05/055092 discloses a method and apparatus for disseminating heterogeneous data through branded electronic information delivery channels. A conglomerate apparatus is employed with three main elements: an authoring apparatus, a content hub and a client apparatus. The purpose of the conglomerate apparatus is to facilitate the delivery of multiple forms of digital content from a content service provider to a content recipient via a client apparatus that when employed by the content recipient will change its shape, colour and other visual and aural attributes so as to reflect branding specified by the content service provider. To achieve this, the content service provider uses the authoring apparatus to create sets of content items and then associate these content sets with brand attributes. The content service provider can also add control information to the content sets that can control the sequence in which content can be accessed by the content recipients. This content and branding information is then published by the content service provider at a content hub that is accessible to the intended content recipient. The content recipient can then access this content and brand information from the content hub. When viewing or otherwise making use of the content using the client apparatus, the branding attributes associated with the content are applied to the client apparatus so that the client apparatus's visual and aural characteristics will reflect the branding attributes intended by the content service provider. The client apparatus also monitors the content recipient's use of the content items and stores metrics about this usage within a database in the client apparatus. These metrics can then be sent back to the content service provider's content hub and then accessed by the content service provider for further analysis.

U.S. Pat. No. 5,760,821 describes a system and method for localizing an aggregated electronic program guide (EPG) schedule covering a plurality of service environments that includes an information filter located at the subscriber's set-top box conditioned to recognize which schedule information is relevant to the viewer's service environment. Only schedule information corresponding to the viewer's own service environment is stored in the EPG's schedule database. The result is an electronic program schedule that is tailored to the viewer's specific service environment without the use of costly equipment on the transmission side of the program schedule feed.

U.S. Pat. No. 6,810,527 describes an end-to-end global distribution system that can produce and deliver live content as well as pre-recorded content and other content, to commercial passenger aircraft via a satellite and ground-based infrastructure. The content can include live television, pre-recorded content, advertisements as well as other content such as software applications, internet material, etc. The delivered content can be tailored based on distribution criteria such as airline, aircraft, origin and destination, flight number, cabin class, and others. Such system can be advertiser-supported and include targeted and distribution specific advertisements. Furthermore, access to the content can be controlled by various conditional access parameters at the server level, to various aircraft zones, and at the passenger level.

International patent application published as WO03/104940 describes systems and methods for recommending programming content to a user. The content may be recommended to a user based on personal context, personal relevancy to a user and/or based on content provider criteria. For example, movies may be recommended based on a mood selected by the user, the user's zodiac sign, and/or any other information relevant to the user. Additionally, interactive gaming simulations may be used to recommend content to users. For example a virtual slot machine, an interactive trivia game, and/or other types of gaming simulations may be employed to recommend content to users. The content provider and/or service provider may also link context suggestions to such interactive gaming simulations.

SUMMARY OF THE INVENTION

A world where vast amounts of content are available, via scheduled broadcasts and on demand, presents a major navigational problem for both viewers and for content aggregators and content providers. Content aggregators and content providers want to offer viewers an easy way to access and view content.

According to an embodiment of the present invention, there is provided a method of presenting content to a viewer, the method including: receiving a schedule of content at a client operable by the viewer, the schedule of content including a directed graph, the directed graph including a plurality of nodes, wherein each node in the plurality of nodes is connected to one or more other nodes in the plurality of nodes by one or more paths, wherein each path represents content presentable to the viewer; traversing the directed graph by following a route between nodes and along paths of the directed graph, wherein at each node the client determines a path to follow according to state information accessible by the client; and presenting content to the viewer as each path is followed.

In some embodiments, the state information includes content previously viewed by the viewer.

In further embodiments, the state information further includes content previously skipped by the viewer.

In other embodiments, the state information further includes content for which the viewer has expressed satisfaction.

In alternative embodiments, the state information further includes content for which the viewer has expressed dissatisfaction.

In some embodiments, the state information further includes a location of the viewer.

In further embodiments, the state information further includes a time and/or day that content is presented to the viewer.

In some embodiments, the method further includes: traversing the directed graph in advance of presenting content to the viewer; identifying content to present to the viewer for each path; and pre-caching identified content.

In further embodiments, content is presented to the viewer by the client requesting unicast delivery of the content from a content playout system.

In some embodiments, the content is presented to the viewer by the client tuning to a live broadcast of the content.

In other embodiments, one or more paths represent a choice of content that is presentable to the viewer.

In further embodiments, the choice of content includes a plurality of content items having a common attribute.

In some embodiments, the state information is stored at the client.

In other embodiments, the state information is stored external to the client.

There is also provided in accordance with a further embodiment of the present invention a method of presenting content to a viewer, the method including: transmitting a schedule of content to a client operable by the viewer, the schedule of content including a directed graph, the directed graph including a plurality of nodes, wherein each node in the plurality of nodes is connected to one or more other nodes in the plurality of nodes by one or more paths, wherein each path represents content presentable to the viewer; and presenting content to the viewer as the client traverses the directed graph, wherein the client traverses the directed graph by following a route between nodes and along paths of the directed graph, wherein at each node the client determines a path to follow according to state information accessible by the client.

There is also provided in accordance with a further embodiment of the present invention a computer program including computer program code means adapted to perform all the steps of any of the previous embodiments when the program is run on a computer.

There is also provided in accordance with a further embodiment of the present invention a computer program as in the previous embodiment and embodied on a computer readable medium.

There is also provided in accordance with a further embodiment of the present invention a device for presenting content to a viewer, the device including: means for receiving a schedule of content at a client operable by the viewer, the schedule of content including a directed graph, the directed graph including a plurality of nodes, wherein each node in the plurality of nodes is connected to one or more other nodes in the plurality of nodes by one or more paths, wherein each path represents content presentable to the viewer; means for traversing the directed graph by following a route between nodes and along paths of the directed graph, wherein at each node the client determines a path to follow according to state information accessible by the client; and means for presenting content to the viewer as each path is followed.

There is also provided in accordance with a further embodiment of the present invention a device for presenting content to a viewer, the device including: means for transmitting a schedule of content to a client operable by the viewer, the schedule of content including a directed graph, the directed graph including a plurality of nodes, wherein each node in the plurality of nodes is connected to one or more other nodes in the plurality of nodes by one or more paths, wherein each path represents content presentable to the viewer; and means for presenting content to the viewer as the client traverses the directed graph, wherein the client traverses the directed graph by following a route between nodes and along paths of the directed graph, wherein at each node the client determines a path to follow according to state information accessible by the client.

BRIEF DESCRIPTION OF THE DRAWINGS

Embodiments of the present invention will be now be described with reference to the drawings in which.

DETAILED DESCRIPTION OF EMBODIMENTS

Figure 1:
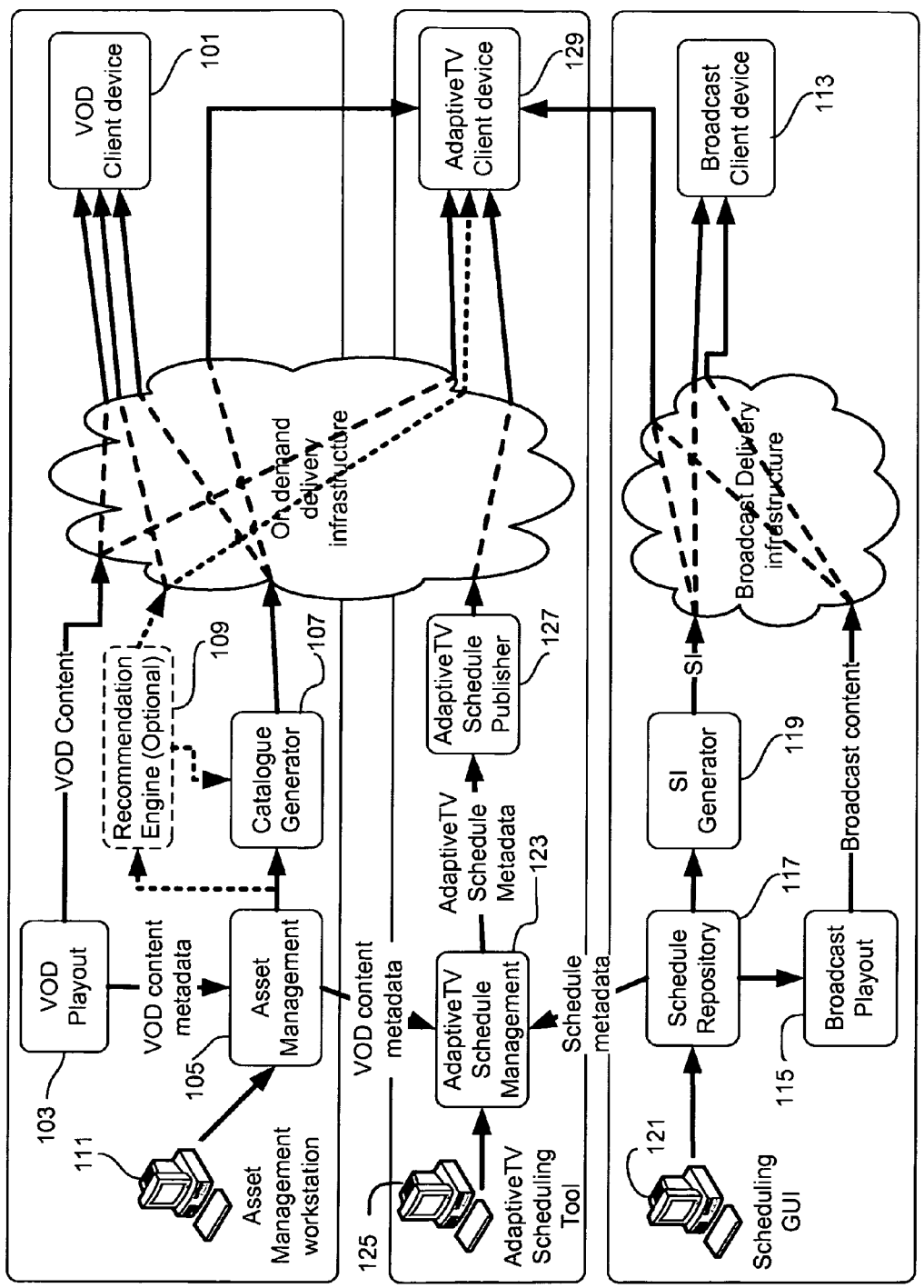
FIG. 1 is a simplified pictorial illustration of a television system architecture constructed and operative in accordance with embodiments of the present invention.

The present invention, in embodiments thereof (hereinafter referred to as AdaptiveTV), presents methods of constructing a dynamic schedule of content that may be different for every viewer. The viewing experience that AdaptiveTV presents is different from that of conventional linear TV and Video-On-Demand (VOD).

In the more generalised model of AdaptiveTV, many of the familiar patterns of TV content consumption that currently require user involvement drift away. For example, AdaptiveTV typically does not require the viewer to explicitly request that each episode in a linked series of content is recorded (as is currently known in systems such as Sky+, available from British Sky Broadcasting), because any shows that the viewer often watches typically reappear automatically in the viewer's dynamic schedule.

The dynamic nature of AdaptiveTV is typically based on a schedule tree ((directed) schedule graph) that has been specifically planned and designed by people. Hence AdaptiveTV presents a new role for the controllers of TV schedules. This schedule tree is then published (or broadcast) to all AdaptiveTV receiving devices, thus controlling the range and flow of dynamic options presented to the viewer. Each AdaptiveTV receiving device is then potentially able to provide a unique sequence of content to the viewer through the way the viewer navigates the schedule tree.

AdaptiveTV is aimed at the large number of viewers who do not want to be forced into a complex interaction with their TV. AdaptiveTV offers a lazy, laid back model of TV content consumption. In this respect it is the direct opposite of the user experience presented by conventional Digital Video Recorders (DVR) and VOD services.

AdaptiveTV typically relies on viewer interaction to enhance and tailor the viewer's content stream to the viewer's specific tastes. However, the viewer is typically not required to provide any input in order for AdaptiveTV to function correctly. All input from the viewer is typically given entirely voluntarily. It is accepted that the less input the viewer providers, the more degraded their experience will become and ultimately, if the viewer does not provide any input at all, the viewer's AdaptiveTV experience will be similar to that of someone watching a conventional, legacy linear TV channel; albeit a TV channel where there are limited repeats and where the content only starts to play when the viewer is ready.

Typically, AdaptiveTV presents the viewer with a number of options to choose from in order to help tailor the TV content stream. For example, if a viewer rejects some content, AdaptiveTV typically asks whether the viewer would like to watch it later or whether they never want to watch it. In order to stay true to the "No Input Required" principle as described previously, all such questions typically time-out. The time-out is typically of the order of a few seconds only and is typically visible to the viewer. Where a question times-out, a default decision is made and AdaptiveTV typically favours the option that maximises the broadcaster's ability to push TV content in front of the viewer. If this question times-out without a response, then the default action is typically to schedule the show for later viewing.

Typically, the maximum number of choices that are ever presented to the viewer is low. More specifically, the maximum number of choices the viewer is typically presented with in response to a single question is four. Typically, the viewer is not presented with more than two questions back-to-back.

When presenting the viewer with questions and options, AdaptiveTV typically uses a predetermined amount of the screen space. However, the amount of the screen space used is typically small. More specifically, AdaptiveTV typically does not occupy more than 10% of the available screen space to present all of its user interface elements.

Moreover, AdaptiveTV typically does not shrink or spatially offset the primary video stream that the viewer is currently watching. The video typically always occupies the whole screen as it would be on a conventional, legacy linear TV channel. Hence, AdaptiveTV typically does not contain full screen user interface elements and no picture-in-guide type behaviour, i.e. AdaptiveTV typically does not reduce the size of the video displayed in order to display AdaptiveTV specific dialog.

Alternatively, when presenting the viewer with questions, options etc., AdaptiveTV uses a separate device connected to the television to present the dialogue.

As the viewer interacts with AdaptiveTV, the dynamic content stream to be presented to the viewer will change to match the viewer's tastes and moods. Sometimes, changes may need to happen quickly in response to a direct stimulus from the viewer. For example, if the viewer indicates that they no longer wish to watch a particular TV show, the TV show is typically removed promptly from the screen. Typically, all transitions, no matter how sudden, are smooth, fluid and seamless. These transitions should be equivalent to those that the viewer would see on the existing conventional, legacy linear TV channels.

AdaptiveTV exploits a number of known techniques to ensure the fluidity of the viewing experience. These typically include, for example, inserting trailers, promos, advertisements, flying logos, etc. However, the result is that the viewer experiences no coarse changes in video or audio.

AdaptiveTV typically gathers viewer input at or around transition points in order to better tailor the TV content stream. This viewer input is typically an aside and the system typically does not stop to wait for such an input (even if it times out). For example, if a viewer rejects a show, AdaptiveTV typically asks whether the viewer would like to watch it later or whether they never want to watch it again. However, this question is typically presented on top of video that is already smoothly transitioning to the next TV content item. Hence, AdaptiveTV typically does not "drop back" to a planner or playlist for the user to select from.

Typically, there are a limited number of high-level decisions a viewer can make about a piece of content currently airing on AdaptiveTV. With respect to providing feedback about content currently airing on AdaptiveTV, viewers can "Dig It" or they can "Ditch It". By "digging" a piece of content, the viewer is expressing positive satisfaction about the piece of content. The act of "digging" a show typically weights the dynamic schedule in favour of further instances of this piece of content or other pieces of content that the broadcaster has connected with it. By "ditching" a piece of content, the viewer is expressing a negative reaction (i.e. dissatisfaction) to watching that piece of content at that particular time. The act of "ditching" may weight the dynamic schedule against this particular piece of content. However, depending on further responses from the viewer, it may just defer the piece of content to be viewed at a future time.

If a viewer watches a piece of content and does not explicitly declare a negative reaction (i.e. does not explicitly "ditch" the piece of content), this is typically interpreted as an implicit "dig" action. For this purpose, "watching" the piece of content does not necessarily imply that the viewer watched the piece of content in a single sitting or that the viewer watched the piece of content in a linear fashion. It simply implies that some predetermined portion/percentage of the content was eventually played out at a viewable speed at least once.

If the viewer switches channels and navigates away from a piece of content, this is typically interpreted as an implicit "ditch action". However, AdaptiveTV typically interprets this as the softest "ditch" action possible and typically reschedules the content again for future viewing. Moreover, navigating away from a piece of content for only a short period of time (e.g. the duration of an advertisement/commercial break) is typically not interpreted as a "ditch action".

When the viewer chooses to "ditch" a show, AdaptiveTV typically asks a follow-up question to further tune the response to the "ditch" action. For example, AdaptiveTV may ask, in response to a "ditch" action: "Ditch for now" (i.e. do you want to "ditch" this piece of content now but possibly view it at some point in the future?) or "Ditch it forever" (i.e. do you want to "ditch" this piece of content and never be offered it again?). Similarly, if a viewer "digs" a piece of content, AdaptiveTV may ask "More of this?" or "More like this?"

Typically, AdaptiveTV relies upon gathering viewer opinion in order to tailor a dynamic schedule to the viewer's specific needs. However, the questions and options presented to the viewer are typically subtle and adaptive and typically originate from the channel scheduler. Typically, they do not follow a simple script but are able to anticipate the viewer's most likely response. This works because, as outlined above, responses to individual questions typically do not dramatically alter the dynamic schedule.

For example, if a viewer is watching a piece of content for the first time and chooses the "ditch" option, it is valid to ask the questions "Ditch for now" or "Ditch forever", as described above. If, however, the viewer has watched different episodes of the same show many times before, then this question becomes less relevant. In such a case, "Ditch for now" is typically assumed to be the answer to the question. If the viewer then goes many weeks without watching an episode of the show, then the question becomes valid again and can be presented to the viewer.

Adaptation of questions typically happens without input from the viewer. Hence concepts such as "Don't ask me this again" are typically not included.

The schedule on AdaptiveTV is dynamic and viewers expect it to change regularly. However, it has been found that viewers also value some predictability in their viewing experience. Furthermore, there is a personal subset of content that the viewer may expect to always be present in their schedule. Consequently, the algorithms employed to interpret the dynamic schedule typically do not cause dramatic or sudden changes. After an initial "cold start" and a "getting to know you" period, the schedule changes are typically slow, gradual and explainable.

AdaptiveTV typically employs a principal of "the most trodden path" in order to ensure that the viewer is presented with a schedule that most matches his/her viewing history. "Most trodden path" means that the number of decisions points needed to displace a piece of content from the dynamic schedule rises (e.g. linearly) with the number of times a piece of content has been viewed without rejection by the viewer. For example, if a viewer has watched two natural history shows over the period of a month, only a few decision points can displace further instances of the natural history show from his/her dynamic schedule. However, if he/she watches a soap opera everyday, then it is very hard to remove the soap opera from his/her dynamic schedule. Typically, this would only occur if he/she specifically rejects the show (i.e. "ditches" the show) on multiple occasions. This principle also ensures that AdaptiveTV is forgiving of incorrect or unintended input from the viewer.

AdaptiveTV typically offers controlled serendipity. That is, the ability to offer the viewer content that he/she has not yet experienced but is likely to enjoy. The serendipitous situations offered by AdaptiveTV differ in principal from those offered by a standard legacy linear channel and also from those made available by known content recommendation engines. Indeed AdaptiveTV falls neatly between these two models. In a standard legacy linear channel, channel schedulers usually analyse audience demographics and place new content in appropriate scheduling slots. Viewers then stumble across new content. In a recommendation based service, new content is presented to the viewer by automated links made to similar content. These links are mostly based upon fuzzy matching processes like collaborative filtering and tag matching. In AdaptiveTV, links between shows are made positively and knowingly by channel schedulers or by other individuals known to the viewer. Explicit linking of this sort enables AdaptiveTV to explain its actions to the viewer as described below.

AdaptiveTV presents a variety of content to a viewer through a tailored dynamic schedule. Typically, AdaptiveTV explains to the viewer why a piece of content has been selected in simple terms. These explanations are typically contained in a single sentence and start with the word because. Examples of such explanations are:

Because you watched other episodes many times;
Because you liked the similar show <show name>;
Because your IM contact Shirley said you might like it;
Because you watch a lot of Westerns;
Because many people think that this is a good show;
Because you said ditch it until later.

Other explanations will be apparent to someone skilled in the art.

If a viewer really likes a show, there will be a tendency for him/her to try to consume all available instances of that show as quickly as possible (often back-to-back). AdaptiveTV typically tries to guard against this by the principle of not offering the viewer "too much cake", i.e. viewing of such desirable content is typically spread over a period of time in order to keep the viewer engaged with the channel for longer. This allows AdaptiveTV channel schedulers to control the rate at which content is consumed and also offers AdaptiveTV channel schedulers an opportunity to schedule particular content near to premium content that it knows the viewer will want to watch. For example, if a viewer has expressed very positive satisfaction for a show and AdaptiveTV knows that they generally are watching TV on Sunday nights, AdaptiveTV may choose to withhold episodes of the show during the week in lieu of a two part special on Sunday night that is scheduled either side of a premium piece of content that the scheduler would like the viewer to see. Thus the premium content may not be discarded by the viewer and may eventually be consumed.

Amongst viewers using a digital video recorders, it has been found that viewers often build "to do lists" of content that they "need" to watch. Typically "series linked" items, such as a soap opera, will build up over a period of time and start to dominate the viewer's DVR planner. Viewers will then be faced with the problem of scheduling enough time to watch this backlog of content or, alternatively, start deleting unwatched items. AdaptiveTV shows a way out of this dilemma by removing the burden of "to do list" management from the viewer. If a viewer did not have time to watch a particular episode of a soap opera, the viewer can rest safe in the knowledge that AdaptiveTV will present that episode again to the viewer at the next opportunity.

Since AdaptiveTV typically works on the principle of "most trodden path", content that the viewer has watched more often is more likely to be rescheduled for him/her. Viewers who have been unable to watch TV for a period of time and have fallen behind on a particular series will recognise that their AdaptiveTV experience is lagging behind that of live TV. However, they will not have to worry about missing any episodes or scheduling extra time to catch-up. They can be confident that it will turn up again in the dynamic schedule. Indeed, for shows where being "up to date" is important (such as reality TV or soap operas), AdaptiveTV typically recognises the situation and attempts to catch the viewer up automatically by scheduling more or longer instances of the backlogged show, if the content scheduler so desires.

Put another way, AdaptiveTV presents a viewer with a set of content as a sequence that typically takes into account both a viewer's previous interaction with the channel scheduler's content and also other external factors, such as time of day, time of year, knowledge of live events taking place or new content available in the channel scheduler's catalogue. Typically, the paths through the content include the possibility for simple viewer choices, such as skip to next show, view next episode and so on.

The paths through the set of content are typically represented by a decision graph with limited choices at each node of the graph. Typically, a viewer is not shown the same content more than once and episodes of a series, although interspersed with other events, are typically presented in sequence.

External triggers typically influence the sequence. For example, at Halloween the channel scheduler may choose to ensure that episodes of a series to be shown relate to Halloween. A "new" episode may appear in the sequence when it is new. The method may engineer that the length of events in the sequence are chosen such that the sequence can include a live event (on time or with a minimal delay).

The potential paths through content are typically defined by the channel scheduler. There are typically a limited number of paths. This differs from conventional personalisation in that the channel scheduler typically defines the paths through the schedule and ensures that the possibilities are limited at each junction node of the schedule.

Previous decisions and viewing typically influence the sequence of events presented to the viewer when they return to the channel in the future. The state information captured for the viewer is also typically carried across to other media where the viewer interacts with the channel scheduler. There is the opportunity for the scheduler to brand the viewing experience by including identity information between content.

FIG. 1 shows an example high level architecture for an implementation of AdaptiveTV. Logical functional blocks for the AdaptiveTV system (middle box) are shown with their relative disposition to a conventional broadcast system (bottom box) and a conventional VOD system (top box). Three types of client device are shown: a broadcast client device 113 (e.g. conventional broadcast STB); a VOD client device 101 (which may be co-resident with the broadcast client device in a hybrid broadcastNOD STB); and an AdaptiveTV client device 129 (which, once again, may co-reside with the broadcast and VOD client devices in a single STB but which may also be a standalone STB, PC, etc.).

Some definitions and also short descriptions of the functional blocks and data flows shown in FIG. 1 will now be provided:

Channel—A branded, continuous service comprised of a fixed but flowing sequence of programme content (e.g. BBC, HBO), which provides a 'lean back' viewing experience (i.e. following channel selection, the passive viewer is exposed to the flowing and continuous sequence of content with little or no interaction required from the viewer).

VOD Client Device 101—Typically referred to as a set top box (STB), this device is typically located in a viewer's home and (subject to suitable authentication/contract) allows access to on-demand video content, via a navigable catalogue. Typically, the VOD client device 101 is a hybrid client device that offers access to both VOD and broadcast content.

VOD Content—Video content delivered via unicast to a VOD client device 101 upon request from the viewer.

VOD content metadata—A self describing "catalogue" style structure, which a viewer can explore and search, via a VOD client device 101, to locate the VOD content that he/she wants to watch. VOD content metadata allows content to be uniquely identified and located, and includes synopsis, genre, and parental-rating type data. Typically, the VOD content metadata conforms to a well-defined metadata standard such as TV Anytime.

VOD Playout 103—A subsystem that stores VOD video content in a format ready to play out to VOD client device 101, and which provides (subject to suitable security/authentication) unicast content playout sessions to VOD client device 101.

Asset Management 105—A subsystem that contains the metadata for managing and monetising all VOD content assets held in the VOD Playout subsystem 103. It also supports packaging of VOD content for sale.

Catalogue Generator 107—Responsible for the on-demand assembly of VOD content metadata, based on the metadata held in the Asset Management subsystem 105, describing a navigable catalogue of assets for consumption by the VOD Client Device 101.

Recommendation Engine 109—An optional subsystem that generates content recommendation metadata either for direct delivery to the VOD client device 101, or for inclusion in catalogue meta-data. Algorithms suitable for use in generating content recommendation metadata will be apparent to someone skilled in the art.

Asset Management Workstation 111—This subsystem provides a human-computer interface for the Asset Management subsystem 105 and supports all metadata management tasks necessary to monetise the VOD content assets held in the VOD Playout system 103, including: VOD content metadata entry, metadata verification, Quality Assurance (QA), VOD content packaging (i.e. grouping VOD content items into purchasable collections) etc.

Broadcast content—video content continuously broadcast/multicast to many viewers via, for example, a satellite broadcast network, a cable broadcast network, an internet protocol television (IPTV) network, a terrestrial broadcast network etc.

Recommendations metadata—Metadata that carries suggestions for content a viewer might like to watch typically based on data about that viewer's viewing or searching history.

Service Information (SI)—A type of metadata in a broadcast stream (e.g. an MPEG-2/DVB stream) that describes the delivery system, content and scheduling/timing of broadcast data streams. SI data provides information to enable the set-top box to automatically separate and decode the various digital program streams.

Broadcast Client Device 113—Typically referred to as a set top box (STB), this device is typically located in a viewer's home and allows access to broadcast content. It also provides an electronic programme guide (EPG) to help identify channels and describe present and forthcoming content. The information presented in the EPG is provided as service information (SI).

Broadcast Playout 115—This subsystem, often a large entity having both machine and human elements, is responsible for playing content into the broadcast delivery infrastructure and typically comprises: video servers, tape players, library staff, live broadcast feeds etc.

Schedule Repository 117—This holds schedule information (a list of event start time, duration, title, synopsis, etc.) for broadcast channels. It is updated via the Scheduling GUI. On any given day, the broadcast schedule structure and broadcast content for a channel can change frequently and right up until the time at which it is broadcast.

SI Generator 119—This subsystem is responsible for the construction/generation of Service Information (SI) based on the schedule metadata received from the Schedule Repository 117 and configuration data describing delivery parameters for each broadcast channel.

Scheduling GUI 121—A tool that the Scheduling operator uses to implement schedules planned by the channel scheduler.

AdaptiveTV Channel—A branded, continuous service comprised of a flowing sequence of programme content that adapts to the viewers taste, and viewing history, with the potential for optional viewer interaction.

AdaptiveTV Schedule Management 123—A subsystem that persists schedules for all AdaptiveTV channels as linear graphs of scheduling primitives. It integrates with the Asset Management 105 and Schedule Repository 117 subsystems to identify content available for inclusion in AdaptiveTV schedules. It also persists intermediate by-products that are required for AdaptiveTV schedule construction such that multiple contributors can work on a schedule for the same AdaptiveTV channel.

AdaptiveTV Scheduling Tool 125—This tool provides a human-computer interface to the AdaptiveTV Schedule Management subsystem 123. It is used by the channel scheduler to plan and design AdaptiveTV schedules for a branded AdaptiveTV channel. The operation and behaviour of the AdaptiveTV scheduling tool 125 will be described in more detail later.

AdaptiveTV Schedule metadata—Graph type structures describing the AdaptiveTV schedule for each AdaptiveTV channel.

AdaptiveTV Schedule Publisher 127—Responsible for the publishing of AdaptiveTV schedules in a format which can be consumed by the AdaptiveTV Client Device 129 (see below), based on the Adaptive schedule metadata held in the AdaptiveTV Schedule Management subsystem 123.

AdaptiveTV Client Device 129—This device is located in the viewer home and (subject to suitable authentication/contract) allows access to AdaptiveTV Channels, VOD content and broadcast content. Typically the AdaptiveTV client device 19 also comprises a storage capability (e.g. a hard disk drive) enabling the storage of content. The AdaptiveTV client device 129 will be described in more detail later.

In a conventional broadcasting system, content is provided in branded channels (a flowing sequence of programmes e.g. HBO, BBC) by aggregators who then utilize the services of broadcast platform operators to deliver channel content to viewers. A schedule of programmes for a channel is planned by the channel scheduler using the Scheduling GUI 121 and once the schedule is provisionally finalised, the schedule is delivered onto the Schedule Repository 117 for a given platform. The SI Generator 119 uses the information in the Schedule Repository 117 to build Service Information (SI) that enables the Broadcast Client Device 113 to locate and (subject to any conditional access mechanisms that are present) decode broadcast content originating from the Broadcast Playout subsystem 115.

In a Video on Demand (VOD) system, VOD content is provided as individual items of VOD content directly to the viewer upon a request for that item of content being received from the viewer. VOD content is stored (ready for delivery) on the VOD Playout system 103 and the Asset Management system 105 holds the VOD content metadata necessary to locate, describe and sell the VOD content. The Asset Management workstation 111 is the administrative tool used for capturing descriptive VOD content metadata associated with VOD content items, packaging the VOD content items for sale, QA etc. Upon receiving a viewer request for VOD content from a VOD Client Device 101, the Catalogue Generator 107 uses the information in the Asset Management system 105 to build a VOD Catalogue through which the viewer can then navigate. The viewer selects an item of content for consumption from the VOD content catalogue after which the VOD Client Device 101 negotiates with the VOD Playout system 103 to initiate a unicast delivery of the desired VOD content item. Additionally, the Catalogue Generator 107 can use the Recommendation Engine 109 to incorporate content recommendations into the VOD catalogue content in order to drive new patterns of VOD content consumption by the viewer.

In an AdaptiveTV system according to embodiments of the present invention, the channel scheduler uses the AdaptiveTV Scheduling Tool 125 (which will be described in more detail below) to assemble an AdaptiveTV Schedule (using primitives which will be described in more detail below) based on VOD content metadata acquired by the Adaptive Schedule Management system 123 from the Asset Management system 105 and based on schedule metadata acquired by the Adaptive Schedule Management system 123 from the Schedule Repository 117. Completed AdaptiveTV schedules persist as linear graphs of scheduling primitives in the Adaptive Schedule Management system 123. Some example AdaptiveTV schedules will be described in more detail later. The AdaptiveTV schedule publisher 127 uses the information held in the Adaptive Schedule Management system 123 to publish AdaptiveTV schedules in a format which can be consumed by the AdaptiveTV Client device 129.

The viewer interacts with AdaptiveTV via an AdaptiveTV client device 129. Control of the AdaptiveTV client device 129 is typically implemented via a remote control, which may be a conventional infra-red remote control or a gesture based remote control. The controls are typically implemented using a button on the remote control, a sequence of buttons on the remote control, a scroll wheel on the remote control, different hand gestures, etc. Alternatively, control can be implemented via a touch sensitive area of a display device. Other methods of controlling the AdaptiveTV client device 129 will be apparent to someone skilled in the art. Typically, the controls available to the viewer include:

Channel Selection—Allows the viewer to select which AdaptiveTV Channel they want to watch;

Dig it—Allows the viewer to signal that they "enjoyed that piece of content and would like to see more";

Ditch it—Allows the viewer to signal that they "didn't like that piece of content and never want to see it again";

Skip it—Allows the viewer to signal that they "don't want to watch (/keep watching) that piece of content now";

Response—Allows the viewer to respond to a simple question/decision branch from the client device;

Explain it—Allows the viewer to find out why they are watching something

What is it—Allows the viewer to access some synopsis/descriptive metadata about the content items they are watching.

Other controls available to the viewer will be apparent to someone skilled in the art.

The AdaptiveTV client device 129 is operable to access state information that enables it to navigate AdaptiveTV schedules. Typically, the state information is stored by the AdaptiveTV client device 129 (but may also be stored externally to AdaptiveTV client device 129) and includes:

Viewer—Who is watching? In a household with many viewers, the AdaptiveTV Client device 129 is typically able to identify which viewer is watching in order to provide them with a truly personalized viewing experience;

Viewing History—What has the viewer watched, and when? Content previously viewed is uniquely identified by a "reference" (e.g. a TV-Anytime content reference identifier (CRID) or similar). For example, the "reference" of the last episode watched in a particular series is stored; the amount of time an AdaptiveTV channel has been viewed for is stored;

Time and day—What time and what day is it now?

Ditching History—What content has a viewer "ditched" and when?

Digging History—What content has a viewer "dug" and when?

Response History—What were the viewer responses to AdaptiveTV schedule questions?

Cached content—Where delivery speeds are faster than streaming or to enable pre-fetching of content in order to optimise delivery network utilisation, content items can be stored/buffered in a local cache.

The AdaptiveTV client 129 typically evaluates user preferences in order to support the principle of "most trodden path" as described previously thus providing the user with a tailored schedule of content that matches the style and tempo of their viewing history. The table below shows a plurality of basic user preferences illustrated in the form of example viewer stories:

| | |
|---|---|
| Preferred show | I prefer to watch 'Baker Bill' |
| Preferred show on channel | I prefer to watch 'Baker Bill' on 'Kiddies' |
| Preferred show @ given time on channel | I prefer to watch 'Baker Bill' at 5 pm on 'Kiddies' |
| Preferred show @ given time and day on channel | I prefer to watch 'Baker Bill' at 5 pm on Saturday on 'Kiddies' |
| Preferred show @ given time | I prefer to watch 'Baker Bill' at 5 pm |
| Preferred show @ given time and day | I prefer to watch 'Baker Bill' at 5 pm on Saturday |
| Preferred genre | I prefer to watch cartoons |
| Preferred genre on channel | I prefer to watch cartoons on 'Kiddies' |
| Preferred genre @ given time on channel | I prefer to watch cartoons at 5 pm on 'Kiddies' |
| Preferred genre @ given time and day on channel | I prefer to watch cartoons at 5 pm on Saturday on 'Kiddies' |
| Preferred genre @ given time | I prefer to watch cartoons at 5 pm |
| Preferred genre @ given time and day | I prefer to watch cartoons at 5 pm on Saturday |
| Preferred genre and sub-genre | I prefer to watch space cartoons |
| Preferred show from genre | I prefer to watch the 'Baker Bill' cartoon |
| Preferred channel @ given time | I prefer to watch 'Kiddies' at 5 pm |
| Preferred channel @ given time and day | I prefer to watch 'Kiddies' at 5 pm on Saturday |
| Preferred time @ given day | I prefer to watch at 5 pm on Saturday |

The preferences and consumption habits of any given viewer gradually evolve. The controls provided by AdaptiveTV client device 129 allow the viewer to explicitly influence the shape of their recorded preferences (e.g. by "digging" or "ditching" content, etc.) The "most trodden path", therefore, is something that is typically monitored constantly by AdaptiveTV client device 129.

The table below provides example methods for establishing the basic viewer preference types as described above based on viewing history:

| | |
|---|---|
| REF preferredShow ( )<br>// noDigs - number of "digs". For the purpose of rank calculations, "ditch" = −1 * "dig", such that noDigs can have a negative value.<br>// digFactor - a weighting factor for "digs" | Returns the unique reference of the show that has the highest ranking calculated as:<br>For all shows:<br>rank = total viewing time inside last 3 months * MAX(1, ( noDigs * dig Factor));<br>If no viewing history exists then return null. |
| REF preferredShowOnChannel (pChannel)<br>// pChannel - channel on which to base show selection | Returns the show that has the highest ranking calculated as:<br>For all shows viewed on pChannel:<br>rank = total viewing time inside last 3 months * MAX(1, ( noDigs * dig Factor));<br>If no viewing history exists for pChannel then return null. |
| REF preferredShowAtTimeOnChannel (pTime, pChannel)<br>// pTime - time on which to base show selection<br>// pChannel - channel on which to base show selection<br>// window = pTime ± 1 hour everyday for the last 3 months | Returns the show that has the highest ranking calculated as:<br>For all shows viewed inside window on pChannel:<br>rank = total viewing time inside window * MAX(1, ( noDigs * digFactor));<br>If no viewing history exists for window on pChannel then return null. |
| REF preferredShowAtTimeAndDayOnChannel (pTime, pDay, pChannel)<br>// pTime - time on which to base show selection<br>// pDay - day on which to base show selection<br>// pChannel - channel on which to base show selection<br>// window = pTime ± 1 hour on pDay for the last 3 months | Returns the show that has the highest ranking calculated as:<br>For all shows viewed on pDay inside window on pChannel:<br>rank = total viewing time inside window * MAX(1, ( noDigs * digFactor));<br>If no viewing history exists for window on pDay on pChannel then return null |
| REF preferredShowAtTime (pTime)<br>// pTime - time on which to base show selection<br>// window = pTime ± 1 hour everyday for the last 3 months; | Returns the show that has the highest ranking calculated as:<br>For all shows viewed inside window:<br>rank = total viewing time inside window * MAX(1, ( noDigs * digFactor));<br>If no viewing history exists for window then return null. |

| | |
|---|---|
| REF preferredShowAtTimeAndDay(pTime, pDay)<br>// pTime - time on which to base show selection<br>// pDay - day on which to base show selection<br>window = pTime ± 1 hour on PDay for the last 3 months; | Returns the unique reference of the show that has the highest ranking calculated as:<br>For all shows viewed on pDay inside window:<br>rank = total viewing time inside window * MAX(1, ( noDigs * digFactor));<br>If no viewing history exists for window on pDay then return null. |
| GENRE preferredGenre( ) | Returns the genre that has the highest ranking calculated as:<br>For all genre g:<br>rank = total viewing time inside last 3 months for all shows having genre g;<br>If no viewing history exists then return null. |
| GENRE preferredGenreOnChannel (pChannel)<br>// pChannel - channel on which to base genre selection | Returns the genre that has the highest ranking calculated as:<br>For all genre g viewed on pChannel:<br>rank = total viewing time inside last 3 months for all shows having genre g;<br>If no viewing history exists on pChannel then return null. |
| GENRE preferredGenreAtTimeOnChannel (pTime, pChannel)<br>// pTime - time on which to base genre selection<br>// pChannel - channel on which to base genre selection<br>// window = pTime ± 1 hour everyday for the last 3 months | Returns the genre that has the highest ranking calculated as:<br>For all genre g viewed on pChannel:<br>rank = total viewing time inside window for all shows having genre g;<br>If no viewing history exists for window on pChannel then return null. |
| GENRE preferredGenreAtTimeAndDayOnChannel (pTime, pDay, pChannel)<br>// pTime - time on which to based genre selection<br>// pDay - day on which to base genre selection<br>// pChannel - channel on which to base genre selection<br>// window = pTime ± 1 hour on pDay for the last 3 months | Returns the genre that has the highest ranking calculated as:<br>For all genre g viewed on pChannel:<br>rank = total viewing time inside window for all shows having genre g;<br>If no viewing history exists for window on pDay on pChannel then return null. |
| GENRE preferredGenreAtTime(pTime)<br>// pTime - time on which to base genre selection<br>//window - pTime ± 1 hour | Returns the genre that has the highest ranking calculated as:<br>For all genre g:<br>rank = total viewing time inside window for all shows having genre g everyday for the last 3 months;<br>If no viewing history exists for window then return null. |
| GENRE preferredGenreAtTimeAndDay(pTime, pDay)<br>// pTime - time on which to base genre selection<br>// pDay - day on which to base genre selection<br>// window = pTime ± 1 hour on PDay for the last 3 months; | Returns the genre that has the highest ranking calculated as:<br>For all genre g:<br>rank = total viewing time inside window for all shows having genre g;<br>If no viewing history exists for window on pDay then return null. |
| SUB-GENRE preferredSubGenreFromGenre(pGenre)<br>// pGenre - genre on which to base sub genre selection | Returns the sub genre that has the highest ranking calculated as:<br>For all shows having p Genre:<br>rank = total viewing time inside last 3 months * MAX(1, ( noDigs * digFactor));<br>If no shows have pGenre then return null. |
| REF preferredShowFromGenre(pGenre)<br>// pGenre - genre on which to base show selection | Returns the unique reference of the show that has the highest ranking calculated as:<br>For all shows having pGenre:<br>rank = total viewing time inside last 3 months * MAX(1, ( noDigs * digFactor));<br>If no shows have pGenre then return null. |

| | |
|---|---|
| CHANNEL preferredChannelAtTime(pTime) // pTime - time on which to base channel selection // window = pTime ± 1 hour everyday for the last 3 months; | Returns the channel that has the highest ranking calculated as: For all channels: rank = total viewing time inside window; If no viewing history exists for window then return null. |
| CHANNEL preferredChannelAtTimeOnDay(pTime, pDay) // pTime - time on which to base channel selection // pDay - day on which to base channel selection // window = pTime ± 1 hour on PDay for the last 3 months; | Returns the channel that has the highest ranking calculated as: For all channels: rank = total viewing time inside window; If no viewing history exists for window on pDay then return null. |
| TIME WINDOW preferredViewingTimeOnDay (pDay) // pDay - day on which to base selection of preferred viewing time | Returns the time window that the viewer most commonly watches for a given day of the week: For all viewing history recorded on pDay in the last 3 months a statistical function (one that is apparent to someone skilled in the art) is used to determine the time window in which most viewing takes place. |

The following table describes some example rules for interrogating the viewer history and ditching history:

| | |
|---|---|
| BOOLEAN showViewed(pContentRef) // pContentRef - unique content item reference to look for in viewing history | Returns true if the viewing history lists pContentRef as having been viewed previously; Otherwise return false. |
| BOOLEAN showDitched(pContentRef) // pContentRef - unique content reference to check for in ditching history | Returns true if the viewing history lists pContentRef as having been ditched previously; or pContentRef belongs to an ordered series for which at least 1 other episode has been ditched; Otherwise return false. |
| BOOLEAN genreDitched(pGenre) // pGenre - genre to check for in ditching history | Returns true if more than e.g. 75% of all shows having pGenre have been ditched; Otherwise return false. |

Figure 2:
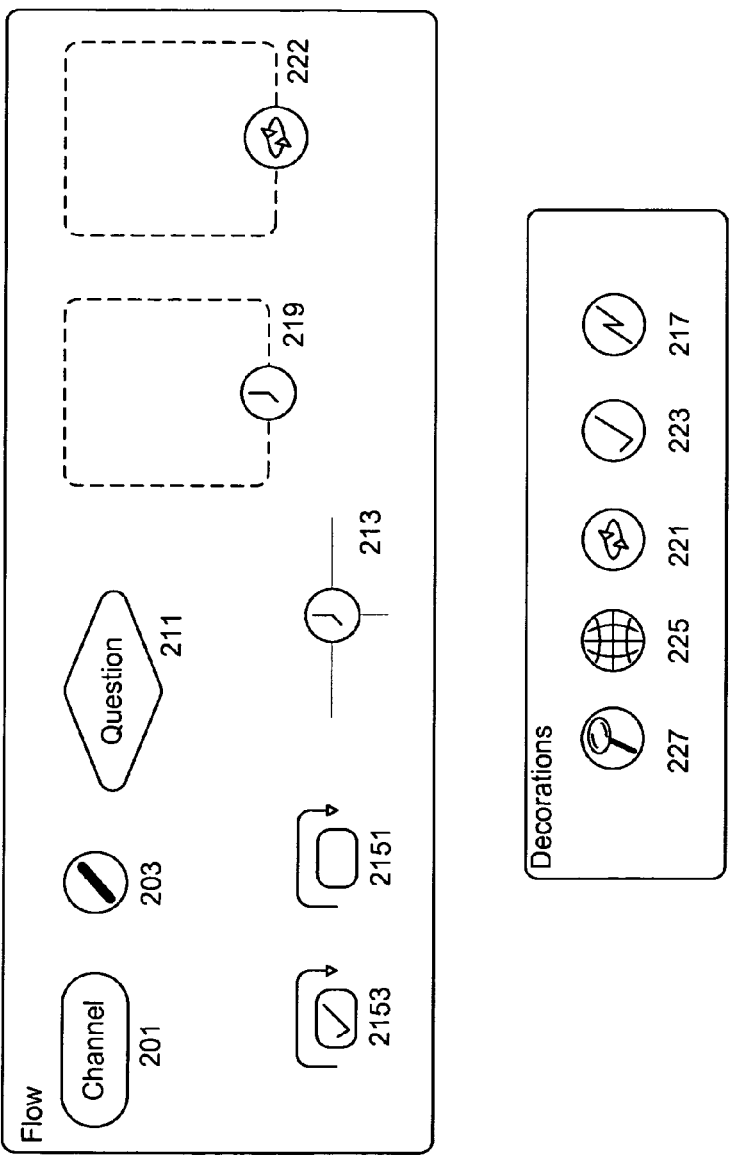
FIG. 2 is an illustration of primitives used to construct a television schedule in accordance with embodiments of the present invention.

Some examples of AdaptiveTV schedule primitives (i.e. AdaptiveTV schedule building blocks—the basic/fundamental units from which AdaptiveTV schedules are derived) will now be described in more detail with reference to FIG. 2.

Functional requirements for each primitive are described in the form of example user stories, which describe the needs of both the viewer and the channel scheduler in relation to a given primitive. Additional user stories will be apparent to someone skilled in the art.

For the example primitives described below, descriptions will also be given of usage (how the primitive is used in assembling an AdaptiveTV schedule); operational rules (how the AdaptiveTV client device 129 interprets the primitive to determine how the AdaptiveTV schedule is followed); and attributes (information which is held relative to each placement of a primitive in an AdaptiveTV schedule in order to allow interpretation of the AdaptiveTV schedule). The primitives described below are examples of primitives that may exist in the AdaptiveTV scheduling system. Other primitives, not described here, may also exist and will be apparent to someone skilled in the art.

START 201—The start of a new Adaptive TV schedule. The START primitive defines the behaviour of the AdaptiveTV schedule for new viewers; returning viewers; viewers who tune back to the AdaptiveTV channel after tuning away temporarily.

Usage Stories
    Viewer Stories—I am a new viewer; I am a returning viewer; I just tuned away temporarily.
    Channel Scheduler Stories—I want to start a new schedule for my channel; I want to treat new viewers differently; I want to show returning viewers a short ident; I want viewers who tune away and back to resume the channel where they were Usage
    Added once to the start of an AdaptiveTV schedule.

Attributes
    Channel—the name of the AdaptiveTV channel;
    IntroMediaReference—uniquely identifies intro video content to play for new viewers;
    RejoinMediaReference—uniquely identifies video content to play to returning viewers;
    TuneBackTimeLimit—how long constitutes a tune away and tune back;
    SchedulePublishDateTime—when the schedule was published.
    ChannelType—{on demand; live; local; hybrid}

Operational Rules
    1) Interrogate the viewing history for this channel:
        1a) If the viewer is new: Show IntroMediaReference;
        1b) If TimeSinceLastViewed>ZapBackTimeLimit: Show RejoinMediaReference.

END 203—Places an end point in the AdaptiveTV schedule and defines the behaviour when the AdaptiveTV channel ends.

User Stories
    Viewer Stories—I don't want my kids to watch this forever
    Channel Scheduler Stories—I want to let viewers know when the schedule will change; I want to let viewers know what they were watching Usage
    Added once to the end of an AdaptiveTV schedule.

Attributes
    ExitMediaReference—uniquely identifies content to play at schedule end;
    NextScheduleDate—when a new schedule is available from this channel.

Operational Rules
  1) Show the ExitMediaReference.
ONE-OFF EVENT 205—a one-off piece of content in the AdaptiveTV schedule.
Usage Stories
  Viewer Stories—I want to watch this now; I don't want to watch this now; I never want to watch this; I have seen this before.
  Channel Scheduler Stories—I want this to be shown to all viewers; I will let viewers skip this content if they want; I will let viewers skip this content if they have viewed it before; I don't want viewers to see this more than once.
Usage
  Added anywhere in an AdaptiveTV schedule graph.
Attributes
  ContentRef—uniquely identifies the item of one-off video content;
  Title—title of the one-off video content item;
  Synopsis—synopsis of the one-off video content item;
  Duration—duration of the one-off video content item;
  Genre—genre of the one-off video content item;
  Skipable—{'always allowed'; 'allowed if viewed'; 'never allowed'; skip if viewed};
  SkipBranch—link to alternate schedule item for use if the one-off video content item is skipped [can only be set when Skipable≠'never allowed'].
Operational Rules
  1) Interrogate the viewing history:
  //automatically skip content items previously viewed if instructed
  //automatically skip "ditched" content items
  //automatically skip content items having a "ditched" genre
    1a) if (Skipable='skip if viewed' and showViewed(ContentRef)=True); or (Skipable≠'never allowed' and showDitched(ContentRef)=True); or (Skipable≠'never allowed' and genreDitched(Genre)=True):
      1a1) if SkipBranch≠null: follow branch;
      1a2) else: advance schedule position to next item & evaluate
  //show new content to viewer
    1b) else: Show ContentRef;
  2) Update viewing history with content viewed.
ORDERED SERIES 207—episodes from an ordered series of content.
Usage Stories
  Viewer Stories—I want to see the next episode; I want to watch from where I left off (halfway through an episode); I don't want to watch this now; I never want to watch this; I have seen this episode before; I have been on holiday and need to catch up as quickly as possible.
  Channel Scheduler Stories—I want an episode from this series to be shown to all viewers; I will let viewers skip this content; I don't want viewers to see this more than once; I want viewers to see the most up-to-date episode; I don't want viewers to watch too many episodes at once.
Usage
  Added anywhere in the AdaptiveTV schedule.
Attributes
  ContentReference—uniquely identifies the episode of the series video content for this item
  Title—title of the episode;
  Synopsis—synopsis for the episode;
  Duration—duration of the episode;
  Genre—genre of the series;
  Skipable—{'always allowed'; 'allowed if viewed'; 'skip if viewed'; 'never allowed'};
  SkipBranch—link to alternate schedule item for use if the episode is skipped [can only be set when Skipable≠'never allowed'];
  NumberOfEpisodes—the number of episodes in the series;
  LinkToNextSeason—link to other seasons of same series;
  CatchUp—{'true'; 'false'}—offer extra episodes to catch up to the latest available episode;
  MaxEpisodesToShow—maximum number of episodes to show sequentially, to prevent offering the user "too much cake";
  MostRecentEpisodeReference—uniquely identifies the most recently published episode
Operational Rules
  1) Interrogate the viewing history:
  //automatically skip series if an episode has been "ditched" before
  //automatically skip series with a "ditched" genre
    1a) if (Skipable≠'never allowed' and showDitched(ContentRef)=true) or (skipable≠'never allowed' and genreDitched(Genre)=true):
      1a1) if SkipBranch≠null: follow branch;
      1a2) else: advance schedule position to next item & evaluate
  //determine if there are new episodes to watch
    1b) Interrogate the viewing history for this channel to determine the LastEpisodeWatchedReference and NumberOfEpisodesWatchedToday:
      1b1) if LastEpisodeWatchedReference=MostRecentEpisodeReference or NumberOfEpisodesWatchedToday>MaxEpisodesToShow: advance schedule position to next item & evaluate;
  //determine the next episode to watch
    1b2) if LastEpisodeWatchedReference precedes MostRecentEpisodeReference and NumberOfEpisodesWatchedToday<MaxEpisodesToShow:
      1b2a) Request NextEpisodeReference from VOD Playout subsystem;
      1b2b) Show NextEpisodeReference;
  2) Update viewing history with content viewed;
  3) if CatchUp='True': return to step 1b (above);
CONTAINER 209—a collection of content having something in common. Can be a container of one-off events or a container of ordered series.
Usage Stories
  Viewer Stories—I like to watch drama/comedy/cartoons etc.
  Channel Scheduler Stories—I want to group content together; I want containers based on a property already defined in my asset management system; I want to create and fill new containers with content from my asset management system; I want to cross sell/cross market my content.
Usage
  Added anywhere in the AdaptiveTV schedule.
Attributes
  As described above for the one-off event primitive but for each content item in the container;
  ContainerName—a display name for the container;
  ContainerContentGenre—a genre classification for the content in the container.
Operational Rules
  On its own, no defined behaviour on a client device but behaviour can be defined by supplementing the container primitive with additional primitives.

VIEWER CHOICE 211—Presents a simple choice/question to the viewer. The viewer is not required to respond in which case default behaviour typically favours the scheduler's decision.

Usage Stories
  Viewer Stories—I would like to watch . . . ; I am not paying attention right now; I don't want to choose; You decide for me.
  Channel Scheduler Stories—I want to give the viewer a simple choice; if the viewer does not make a decision, I want them to see . . . .

Usage
  Added to any flow in the AdaptiveTV schedule. Typically between 2 and 4 choices can be given in addition to a timeout/default choice. Decision text for each choice/branch and a timeout time limit are defined.

Attributes
  NumberBranches—the number of choice branches;
  BranchQuestion—a question to display;
  For each branch
    BranchLabel—label to display for each branch;
    ResponseButton—{'red'; 'green'; 'yellow'; 'blue'}—user control associated with each BranchLabel.
  DefaultBranch—branch to follow in the event of no user response;
  TimeOutPeriod—time to wait before assuming no user response.

Operational Rules
  1) present BranchQuestion and ResponseButton for each branch to viewer;
    2a) if viewer supplies a response: follow appropriate branch to next schedule item;
    2b) if ResponseTime>TimeOutPeriod: follow default branch to next schedule item.

TIME BRANCH 213—Breaks the AdaptiveTV schedule flow out into alternate flows depending on the current time.

Usage Stories
  Viewer Stories—I like to see news in the morning; I like to watch drama in the evenings.
  Channel Scheduler Stories—I want the schedule to be like this in the morning; I want the schedule to be like this in the evening; if someone joins after this time I want them to see this content.

Usage
  Added to any flow in an AdaptiveTV schedule. As many flow branches as required can be set. Time entry conditions for each branch can be specified.

Attributes
  A time based entry condition for each time branch.

Operational Rules
  1) Determine the local time on the client device;
  2) Identify branch with matching entry condition;
  3) Follow branch to next schedule item.

SKIP BRANCH 2151/2153—Defines the direction/behaviour of the AdaptiveTV schedule when an item is 'skipped'. Content can be always skipable (2151) or only skipable if already viewed (2153).

Usage Stories
  Viewer Stories—I want to skip the content being shown to me; what can I watch instead?
  Channel Scheduler Stories—If someone skips this item I want them to see this item instead.

Usage
  A "flow line" can be drawn from any event or container in an AdaptiveTV schedule to a destination point to "skip" that particular event or container. Typically, a second flow line drawn from an event or container is assumed to be a skip. The destination point can be any type of AdaptiveTV primitive. The skip can only be drawn from a content item for which "Skipable t Never Allowed" (see below). The line is typically automatically marked to reflect the "Skipable" attribute of the start content.

Attributes
  Skipable={never allowed; always allowed; allowed if viewed; skip if viewed};
  BranchDestination—where to go if skip branch is followed.

Operational Rules
  1) Advance the schedule position to the item at BranchDestination.

LIVE EVENT 217—live content in the AdaptiveTV schedule.

Usage Stories
  Viewer Stories—As described above for the one-off event primitive plus: I want to watch the event but not live; I don't want to be shown the results before I have viewed the event.
  Channel Scheduler Stories—As described above for the one-off event primitive plus: I will let viewers view this as-live (i.e. not live but shown in full with no indication of what happens during the event).

Usage
  Live event properties can be added to any item in the AdaptiveTV schedule.

Attributes
  ContentReference—uniquely identifies the live event content item;
  Synopsis—synopsis for the live event content item;
  Duration—duration of the live event content item;
  Genre—genre of the live event content item;
  Skipable—{'always allowed'; 'never allowed', 'allowed if viewed'; 'skip if viewed'}
  SkipBranch—link to alternate schedule item for use if the episode is skipped [can only be set when Skipable≠'never allowed'];
  StartDateTime—Date and time the live event is due to air;
  Padding—an amount of time at the start of the live event before the "main" event starts (e.g. introductory comments and analysis of a live sports event);
  Trickplay—{allowed; not allowed}

Operational Rules
  1) Interrogate the viewing history:
  //automatically skip content with ditched genre
    1a) if (Skipable≠'never allowed' and genreDitched (Genre)=true):
      1a1) if SkipBranch≠null: follow branch;
      1a2) else: advance schedule position to next item & evaluate
  //show live event content to viewer
    1b) else: Show ContentRef;
  2) Update viewing history with content viewed.

LIVE RENDEZVOUS 219—Directs the AdaptiveTV schedule flow to rendezvous with a live event (or near-live event). This may be by skipping longer AdaptiveTV schedule entries, padding out gaps with shorter content items, inviting the viewer to resume what they are currently viewing at a later time, etc.

User Stories
  Viewer Stories—I want to see the {live event}
  Channel Scheduler Stories—I want whatever the viewer is watching to end/suspend by this time so that they view the {live event}.

Usage
  The 'rendezvous box' is dragged around any group of items in the AdaptiveTV schedule to create a 'rendezvous group'. The rendezvous group is then linked to a live event. Optionally, the rendezvous group is linked to a container of "filler" events. The behaviour of the rendezvous group in terms of switching to the live event is defined.
Attributes
  LiveEventReference—Link to live event associated with the rendezvous group;
  FillerContainer—Link to container of filler container associated with the rendezvous group;
  RendezvousMode—{scene pause; pause; skip}—nominated rendezvous strategy.
Operational Rules
  With knowledge of the current time, the AdaptiveTV client can meet a rendezvous point in a number of ways. For example, completely skipping content items in the rendezvous group; making a 'soft' exit from the content item currently being viewed (e.g. exit at the end of a scene) and allow the viewer to resume from the 'soft' exit point at a later time; making a 'hard' exit from the content item currently being viewed (e.g. exit the content immediately) and allow the viewer to resume from the 'hard' exit point at a later time; using any "padding" provided at the start of the live event to make an approximate rendezvous and ensure that the viewer still sees the live event of interest itself); showing the live event almost live by using DVR-type inbuilt storage; for AdaptiveTV schedules consisting of long and short content, skipping the longer items and supplementing the shorter items by adding material from a "filler" container; etc.
PREFERRED/FAVOURITE 221—Uses viewer "preferences" to select from a range of alternate content.
User Stories
  Viewer Stories—As described above for the one-off event primitive plus: I like to watch content of this genre; my favourite soap opera is . . . ; I don't have a favourite.
  Channel Scheduler Stories—I want to offer the viewer content of their preferred genre; I want viewers without a favourite to see . . . ; I want to define the range of content viewers can "prefer" from.
Usage
  Applied to any container to apply preference selection properties.
Attributes
  ContentLinks—{One off event; live event; Ordered series}—links to each item of content in the container to which the preferred/favourite primitive is applied;
  ContainerName—a display name for the container to which the preferred/favourite primitive is applied;
  ContainerContentGenre—a genre classification for the content in the container to which the preferred/favourite primitive is applied;
  DefaultChoice—uniquely identifies a default content item for viewers with no viewing history available;
  ElectionMode—{'show by genre', 'show from genre', 'show by time'}—for 'show by genre', the container to which the preferred/favourite primitive is applied is filled with content of different genres—the intent being to show the viewer content of the viewer's preferred genre; for 'show from genre', the container to which the preferred/favourite primitive is applied is filled with content of the same genre (or sub-genre, the intent being to show the viewer some favourite content of a particular genre (or sub-genre); for 'show by time', the container to which the preferred/favourite primitive is applied is filled with a range of popular content of different genres, the intent being to show the viewer the content they most prefer to watch at that time of day.
Operational Rules
  1) Determine current Time and Day for client device;
  2) Select content from container according to the ElectionMode:
    2a) if ElectionMode='show by genre':
      2a1) interrogate viewing history to determine preferred genre at the current Time: preferred genre=preferredGenreAtTime(Time);
      2a2) Check that a content item having preferred genre is in the container:
        2a2a) if present, select and evaluate content item;
        2a2b) else: select DefaultChoice and evaluate;
    2b) if ElectionMode='show from genre':
      2b1) Interrogate viewing history to determine preferred show from genre at current Time: preferred show=preferredShowFromGenre(ContainerContentGenre);
      2b2) Check the preferred show is in the container:
        2b2a) if preferred show is present: select the preferred item and evaluate;
        2b2b) else: select the DefaultChoice and evaluate;
    2c) if ElectionMode='show by time':
      2c1) Interrogate viewing history to determine preferred show @ current Time and Day: preferred show=preferredShowAtTimeAndDay(Time, Day);
      2c2) Check the preferred show is in the container:
        2c2a) if preferred show is present: select the preferred item and evaluate;
        2c2b) else: select the DefaultChoice and evaluate;
  3) Evaluate the selected content item according to the operational rules for primitive type of the content item:
    3a) if the content was not available: select and evaluate the DefaultChoice;
  [It will be apparent to someone skilled in the art that these operational rules can be recombined in a number of alternate ways to develop different preference strategies and also that the number of ElectionModes can be increased to cover all the preference rule definitions described previously.]
Preference Group 222
User Stories
  Viewer Stories—I prefer to watch a news program first thing in the morning.
  Channel Scheduler Stories—I want the schedule ordering to adapt to the viewer's habits.
Usage
  The 'preference group' box is dragged around a group of content items/containers in the schedule graph and then the box is joined into a schedule flow.
Attributes
  ContentLinks—{One off event; live event; Ordered series}—links to each item of content in the preference group box.
Operational Rules
  1) Determine current Time and Day for client device;
  2) Determine if there is any viewing history for this channel:
  //Determine next item to view if no history
    2a) if there is no viewing history: check if any schedule sequence is defined for the group:
      2a1) if sequence defined: advance schedule position to next item in sequence and evaluate;
      2a2) else: select the next item at random and evaluate;

//Determine next item to view based on viewing history
  2b) Interrogate viewing history as follows:
    2b1) if (null≠preferredShow=preferredShowAtTimeAndDayOnChannel(Time, Day, this channel)) and (preferredShow in ContentLinks): select PreferredShow and evaluate;
    2b2) else if (null≠preferredShow=preferredShowAtTimeOnChannel(Time, this channel)) and (preferredShow in ContentLinks): select PreferredShow and evaluate;
    2b3) else if (null≠preferredShow=preferredShowOnChannel (this channel)) and (preferredShow in ContentLinks): select PreferredShow and evaluate;
    2b4) else if (null≠preferredShow=preferredShowAtTimeAndDay(Time, Day)) and (preferredShow in ContentLinks): select PreferredShow and evaluate;
    2b5) else if (null≠preferredShow=preferredShowAtTime (Time)) and (preferredShow in ContentLinks): select PreferredShow and evaluate;
    2b6) else if (null≠preferredShow=preferredShow( )) and (preferredShow in ContentLinks): selectPreferredShow and evaluate;
    2b7) else if (null≠preferredGenre=preferredGenreAtTimeAndDayOnChannel (Time, Day, this channel)) and (ContentLinks contains an item having preferredGenre): select content item having preferredGenre and evaluate;
    2b8) else if (null≠preferredGenre=preferredGenreAtTimeOnChannel(Time, this channel)) and (ContentLinks contains an item having preferredGenre): select content item having preferredGenre and evaluate;
    2b9) else if (null≠preferredGenre=preferredGenreOnChannel (this channel)) and (ContentLinks contains an item having preferredGenre): select content item having preferredGenre and evaluate;
    2b10) else if (null≠preferredGenre=preferredGenreAtTimeAndDay(Time, Day)) and (ContentLinks contains an item having preferredGenre): select content item having preferredGenre and evaluate;
    2b11) else if (null≠preferredGenre=preferredGenreAtTime (Time)) and (ContentLinks contains an item having preferredGenre): select content item having preferredGenre and evaluate;
    2b12) else if (null≠preferredGenre=preferredGenre( )) and (ContentLinks contains an item having preferredGenre): select content item having preferredGenre and evaluate;
    2b13) else finished—all content in preference group has been considered;
  3) Remove the content item evaluated from further consideration;
  4) Repeat from step 1 until the content of the preference group is exhausted.

RECOMMENDATION 223—Recommends content to a viewer.
User Stories
  Viewer Stories—I would like to see something new.
  Channel Scheduler Stories—I want to make recommendations to my viewers.
Usage
  Applied to any container to generate a recommendation based upon the container contents and viewer history.

NAVIGATION 225—Allows the viewer to navigate through a collection of content. Enables more of a lean forward experience for the viewer.
User Stories
  Viewer Stories—I know what sort of film I am looking for, I'm ready to interact with the television.
  Channel Scheduler Stories—I want to provide a catalogue navigation experience to my viewers.
Usage
  Applied to any container to make it navigable. Navigable container added anywhere in an AdaptiveTV schedule.

SEARCH 227—Invites the viewer to search the contents of a container.
User Stories
  Viewer Stories—I know exactly what I am looking for.
  Channel Scheduler Stories—I want to allow viewers to find exactly what they want.
Usage
  Applied to any container in the AdaptiveTV schedule to make it searchable. Searchable container added anywhere in an AdaptiveTV schedule.

The operation of the AdaptiveTV client device will now be described in more detail.

When the adaptive TV client device is powered up, it: connects to AdaptiveTV schedule publisher 127 and also to VOD playout system 103; requests a full list of available AdaptiveTV channels; typically identifies the user; queries the viewing history to determine the preferred AdaptiveTV channel at the current time and on the current day according to the preferredChannelAtTimeOnDay preference rule as described above; and tunes to the preferred AdaptiveTV channel.

Alternatively, after the AdaptiveTV client device requests a full list of available adaptive channels, it requests a full set of schedules for a pre-stored list of "favourite channels" and registers for notification of updates to the schedules of all the "favourite channels".

On tuning to the preferred AdaptiveTV channel, the AdaptiveTV client device: requests a full schedule for the preferred AdaptiveTV channel; registers for notification of updates to the schedule of the preferred AdaptiveTV channel; and plays the schedule for the preferred AdaptiveTV channel.

In response to a schedule update notification received for the preferred AdaptiveTV channel, the AdaptiveTV client device: requests a full schedule for the preferred AdaptiveTV channel; re-evaluates the content item currently playing and if necessary: advances to the next item in the schedule (e.g. if the content is embargoed); and/or suspends the currently showing content item immediately (e.g. in deference to an emergency alert content item).

In response to spontaneous viewer inputs, the AdaptiveTV client device will:
  For Channel Selection: tune to the selected channel;
  For Dig it: update the viewing history;
  For Ditch it:
    update the viewing History; and
    if Skipable≠"never allowed":
      if SkipBranch defined: Follow branch;
      else: advance schedule play to next content item;
  For Skip it:
    update the viewing History; and
    if Skipable≠"never allowed":
      if SkipBranch defined: Follow branch;
      else: advance schedule play to next item;
  For Explain it: explain why this is being shown (e.g. by displaying an on-screen message);
  For What is it: display synopsis information.

To update the viewing history the AdaptiveTV Client device: persists information about the new entry in the viewing history.

To play content items from the AdaptiveTV schedule, the AdaptiveTV Client device: traverses the AdaptiveTV schedule in the sequence described by the graph order; and evaluates each primitive encountered in the AdaptiveTV schedule graph by applying the operational rules applicable to that primitive as described above.

Alternatively, in order to optimise content acquisition/preparation, the AdaptiveTV client device may elect to fully parse the AdaptiveTV schedule ahead of playing content from the AdaptiveTV in order to allow pre-caching of content either from VOD playout system 103 or from broadcast playout 115. As soon as an AdaptiveTV schedule is delivered to an AdaptiveTV client, the client can begin to negotiate for the delivery of content appearing in the delivered AdaptiveTV schedule.

By parsing AdaptiveTV schedules from multiple clients, it is also possible, according to embodiments of the present invention, to flatten the demand graph in a content delivery network. That is to say, by analysing viewer habit, predicting viewer need based on published AdaptiveTV schedules and pre-caching content, a highly predictable picture of what content is needed where (i.e. by whom) and when can be built up and the use of a content delivery network can be optimised in order to supply content to AdaptiveTV client devices in an efficient manner that avoids the problem of bandwidth demand spikes (i.e. excessive demands for bandwidth) in the content delivery network. The state data stored by AdaptiveTV clients can also be sent back to the AdaptiveTV Schedule Management subsystem and used to enhance audience measurement data and analytics to further optimise content acquisition/delivery.

To show content from the AdaptiveTV schedule, AdaptiveTV Client device: confirms availability of the content with VOD playout subsystem 103; requests unicast delivery of the content direct to the AdaptiveTV client device; and plays the content. Alternatively, the AdaptiveTV client device tunes into a live broadcast of the content item and either caches it for later presentation to the viewer or plays the content immediately.

Figure 3:
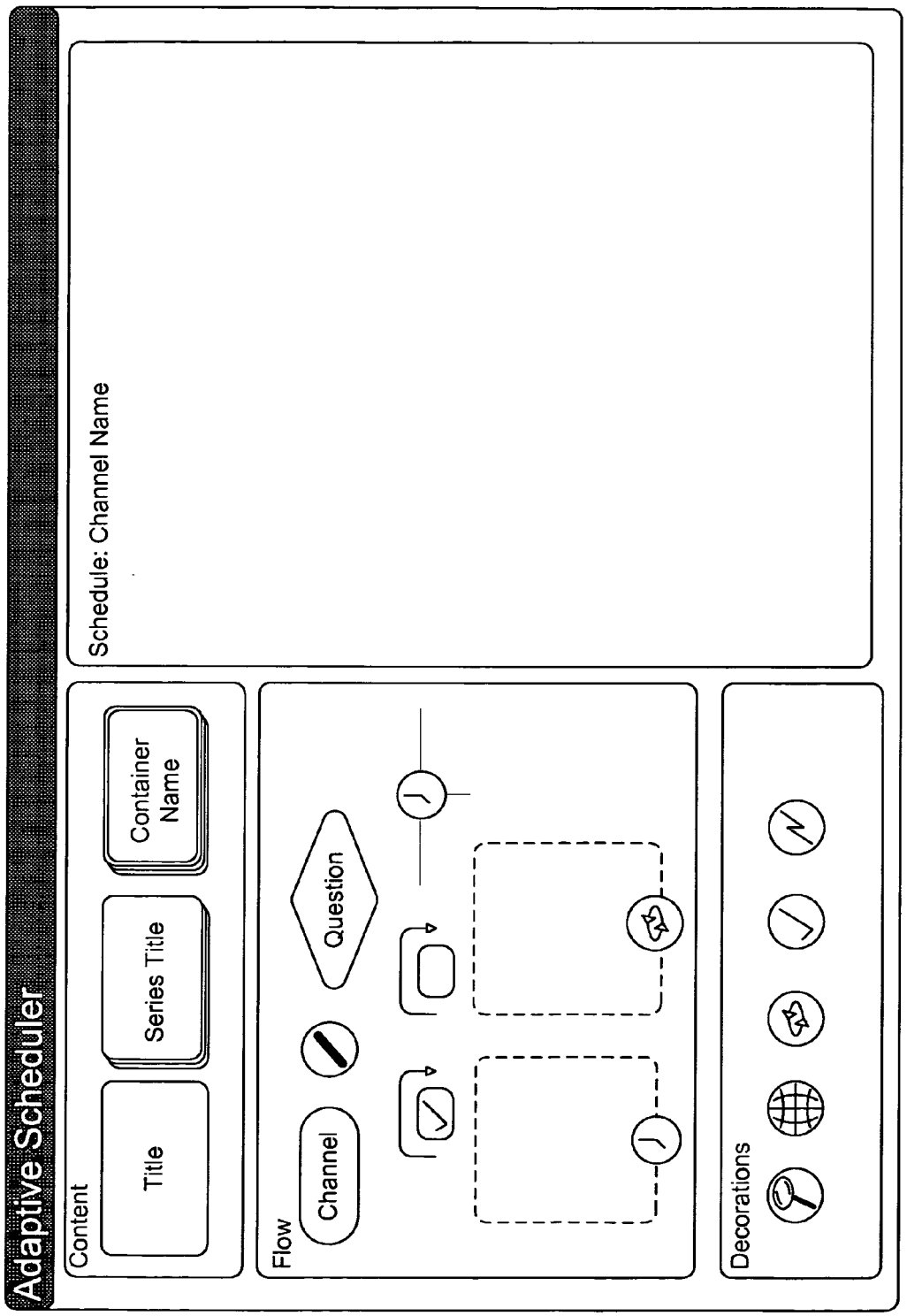
FIG. 3 is an illustration of a user interface used by a television channel controller/scheduler to construct a television schedule in accordance with embodiments of the present invention.

As was mentioned above, in an AdaptiveTV system according to embodiments of the present invention, the channel scheduler uses the AdaptiveTV Scheduling Tool 125 to assemble an AdaptiveTV Schedule (using primitives) based on VOD content metadata acquired by the Adaptive Schedule Management system 123 from the Asset Management system 105 and based on schedule metadata acquired by the Adaptive Schedule Management system 123 from the Schedule Repository 117. Completed AdaptiveTV schedules persist as linear graphs of scheduling primitives in the Adaptive Schedule Management system 123. These linear graphs are typically 'built' by the channel scheduler using the AdaptiveTV scheduling tool 125, which provides an interface for the channel scheduler to the Adaptive Schedule management system 123. An example of the interface provided by the AdaptiveTV scheduling tool 125 can be seen in FIG. 3 where the primitives are provided in clickable palette windows on the left hand side of the tool interface. The channel scheduler builds an AdaptiveTV channel schedule by dragging primitives from the palette windows into the schedule window on the right.

Some examples of how AdaptiveTV Schedules are constructed and interpreted by the client device will now be given with reference to FIGS. 4 to 11.

Figure 4:
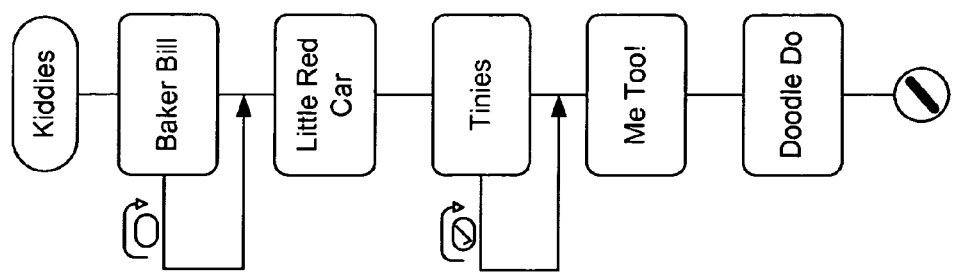

Referring to FIG. 4, an AdaptiveTV schedule is shown for the "Kiddies" AdaptiveTV channel. The content items presented to viewers tuning in to the channel at the start (after any intro media is shown) are 'Baker Bill', 'Little Red Car', 'Tinies', 'Me Too!' and 'Doodle Do'. With no interaction from the viewer, these content items are presented to the viewer one after the other. However, it will be noted that skip branches are attached to 'Baker Bill' and 'Tinies'.

While playing 'Baker Bill' the AdaptiveTV client 'listens' for a skip command and if a skip command is received (i.e. a viewer has pressed a 'skip' button", the AdaptiveTV client evaluates the content's "Skipable" attribute, which in this case is "Always allowed", and therefore skips 'Baker Bill' and starts playing 'Little Red Car' instead (i.e. follows the skip branch and starts playing the content item at the end of the skip branch).

The skip branch associated with 'Tinies' indicates that 'Tinies' can be skipped if it has already been viewed. Thus, when 'Tinies' is reached, the AdaptiveTV client evaluates the viewing history held by the AdaptiveTV client device and if the viewing history indicates that 'Tinies' has already been viewed then 'Tinies' is skipped and 'Me Too!' is played instead (i.e. the AdaptiveTV client device follows the skip branch and starts playing the content item at the end of the skip branch). If 'Tithes' has not been viewed then 'Tithes' is played for the viewer.

Alternatively, the AdaptiveTV client device could be configured to always play the content unless a skip command is received. In such a case, while playing 'Tinies' the AdaptiveTV client 'listens' for a skip command and if a skip command is received (i.e. a viewer has pressed a 'skip' button", the AdaptiveTV client evaluates the content's "Skipable" attribute, which in this case is "Allowed if viewed". The AdaptiveTV client evaluates the viewing history held by the AdaptiveTV client device and if the viewing history indicates that 'Tinies' has already been viewed then 'Tinies' is skipped and 'Me Too!' is played instead (i.e. the AdaptiveTV client device follows the skip branch and starts playing the content item at the end of the skip branch). If 'Tinies' has not been viewed then 'Tinies' is played for the viewer.

This 'Kiddies' AdaptiveTV channel schedule ends after 'Doodle Do' has been played (and any exit media is shown to the viewer).

Figure 5:
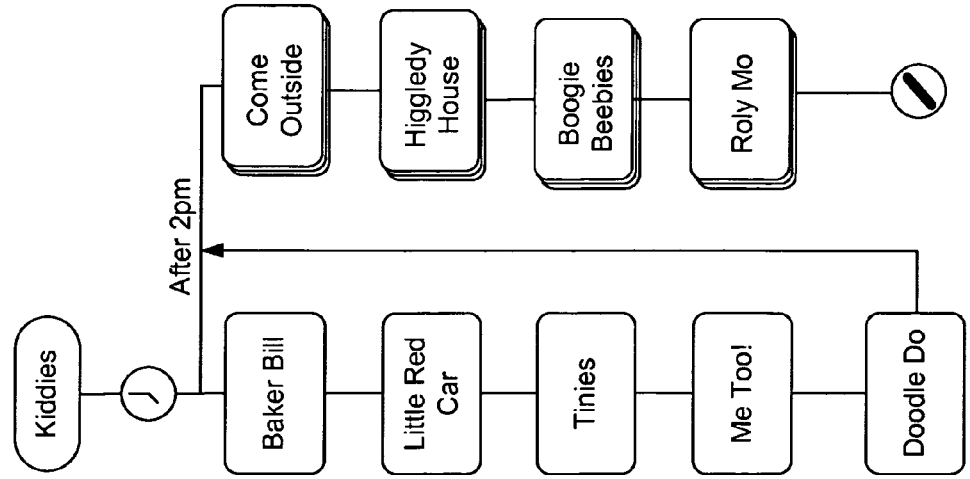

Referring now to FIG. 5, another AdaptiveTV schedule is shown for the "Kiddies" AdaptiveTV channel. In this AdaptiveTV schedule, a time branch has been placed at the start of the schedule so that the AdaptiveTV client device checks the time before starting to play out content. If the time is before 2 pm then the schedule starts with 'Baker Bill' and proceeds with 'Little Red Car', 'Tinies', 'Me Too!' and 'Doodle Do' followed by episodes of 'Come Outside', 'Higgledy House', 'Boogie Beebies' and 'Roly Mo'. If, on the other hand, the time is after 2 pm, the schedule jumps straight to an episode of 'Come Outside' and then proceeds to with episodes of 'Higgledy House', 'Boogie Beebies' and 'Roly Mo'.

Figure 6:
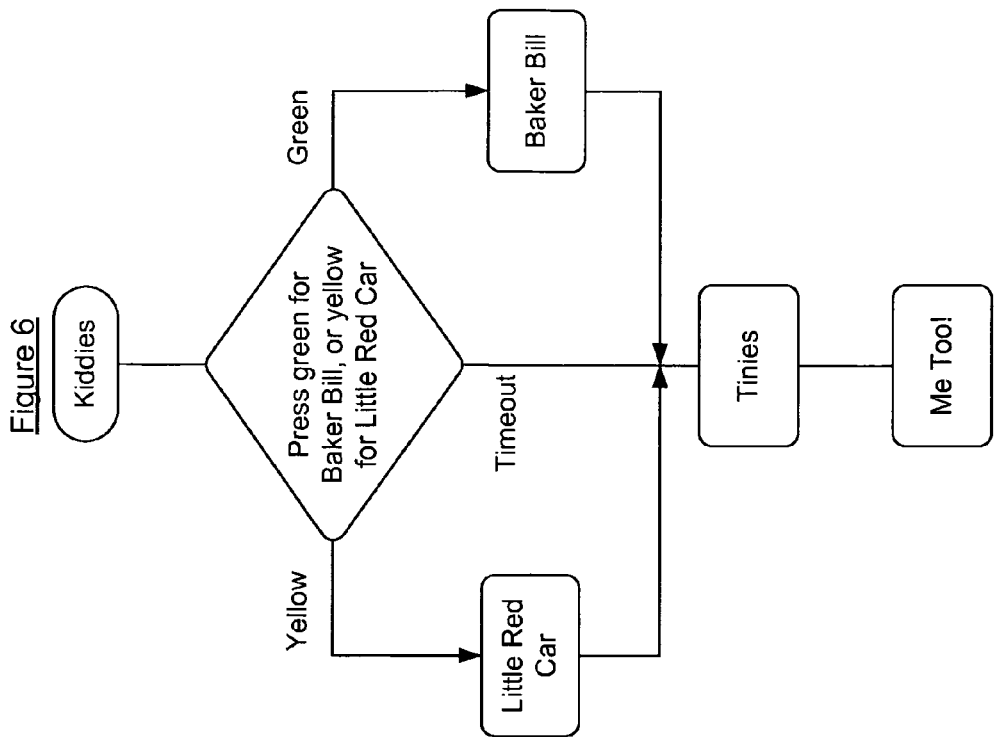
FIGS. 4 to 11 are illustrations of television schedules constructed in accordance with embodiments of the present invention.

Referring now to FIG. 6, another AdaptiveTV schedule is shown for the "Kiddies" AdaptiveTV channel. In this AdaptiveTV schedule, choice branch has been placed at the start of the schedule so that the AdaptiveTV client checks what the viewer would like to watch before starting to play out the first content item. In this example, the viewer is told to press the 'yellow' button on his/her remote control device to view 'Little Red Car' or press the 'green' button on the remote control device to view 'Baker Bill'. After either 'Little Red Car' or 'Baker Bill' has been played out, 'Tinies' is played out followed by 'Me Too!'. If the viewer does not provide a response to the choice offered within a predetermined timeout period, then 'Tinies' is played out to the viewer. Additionally, the viewer could also be given a third choice of doing nothing in order to view 'Tinies'.

Figure 7:
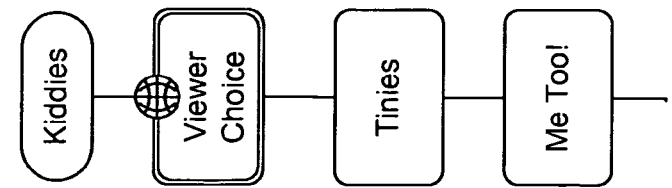

Referring now to FIG. 7, another AdaptiveTV schedule is shown for the "Kiddies" AdaptiveTV channel. In this AdaptiveTV schedule, a navigation primitive has been added to the first content container primitive so that the viewer is presented with a navigable menu of content from that particular content container and is asked to choose which content item from the container they would like to view. The content item chosen by the viewer is then played out followed by 'Tinies' and 'Me Too!'. Typically, if the viewer does not select a content item from the container within a predetermined timeout period, 'Tinies' is played out to the viewer.

Figure 8:
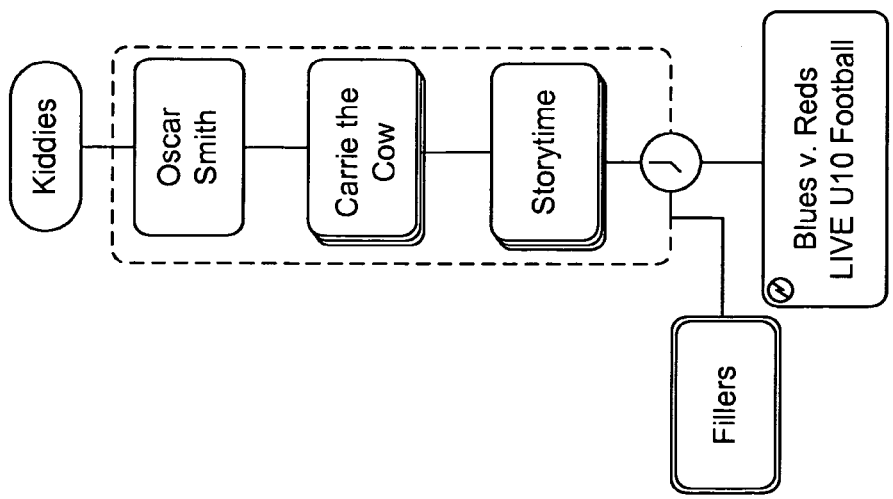

Referring now to FIG. 8, another AdaptiveTV schedule is shown for the "Kiddies" AdaptiveTV channel. In this AdaptiveTV schedule, a rendezvous point with the 'Blues v. Reds LIVE U10 Football' live event is provided. The live event content item is schedules to start at 18:15. In this example, the live event has 5 minutes of "pundit time" which is not essential to view (i.e. the time in between the start of the playing out of the live event content item (18:15) and the start of the live event itself (18:20)). The AdaptiveTV client analyses the time when the viewer joins the AdaptiveTV channel and processes the AdaptiveTV schedule in dependence on what time the viewer joins the channel:

Viewer A, who joins the channel at 16:20, will be shown 'Oscar Smith' (90 minutes duration, i.e. 16:20 to 17:50), one new (for the viewer) episode of 'Carrie the Cow' (5 minutes duration, i.e. 17:55 to 17:55), one new (for the viewer) episode of 'Storytime' (20 minutes duration, i.e. 17:55 to 18:15), and then the live event at the live event rendez-vous time of 18:15.

Viewer B, who joins the channel between 16:40 and 16:45, will be shown 'Oscar Smith', one new (for the viewer) episode of 'Carrie the Cow', and then the live event. The rendezvous with the live event will take place in between 18:15 and 18:20 depending on when exactly the viewer joined the channel. The viewer may miss some of the 'pundit time' but will not miss any of the live event itself.

Viewer C, who joins the channel at 17:00, will be shown one new (for the viewer) episode of 'Carrie the Cow' (5 minutes duration, i.e. 17:00 to 17:05) and one new episode of 'Storytime' (20 minutes duration, i.e. 17:05 to 17:25). Before the rendez-vous with the live event, the viewer will be shown approximately 50 minutes of content from the Fillers container (i.e. AdaptiveTV client device analyses the contents of the Fillers container and finds content items whose combined duration is up to 55 minutes and will end in time to rendezvous with the live event at 18:15 or before 18:20.)

Figure 9:
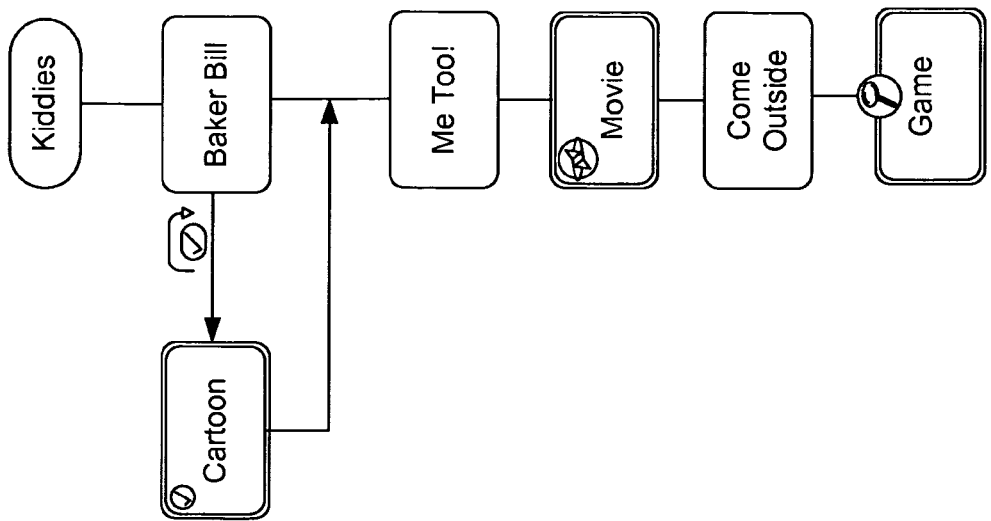

Referring now to FIG. 9, another AdaptiveTV schedule is shown for the "Kiddies" AdaptiveTV channel. In this AdaptiveTV schedule, if a viewer decides to skip 'Baker Bill' (having already viewed 'Baker Bill' since the skip is only permitted if 'Baker Bill' has already been viewed), the viewer is offered one of a recommended selection of cartoons from the Cartoon content container based on the viewer's previous viewing habits. Typically, it is up to the channel scheduler to decide what the recommendations are and where the recommendations come from. Once either 'Baker Bill' or a recommended cartoon has been played out, 'Me Too!' is offered to the viewer for viewing. After 'Me Too!' has been played out, the viewer is offered a movie of his/her preferred genre, after which 'Come Outside' is played out to the viewer. the viewer is then allowed to search through a container of game shows and select one to view.

Figure 10:
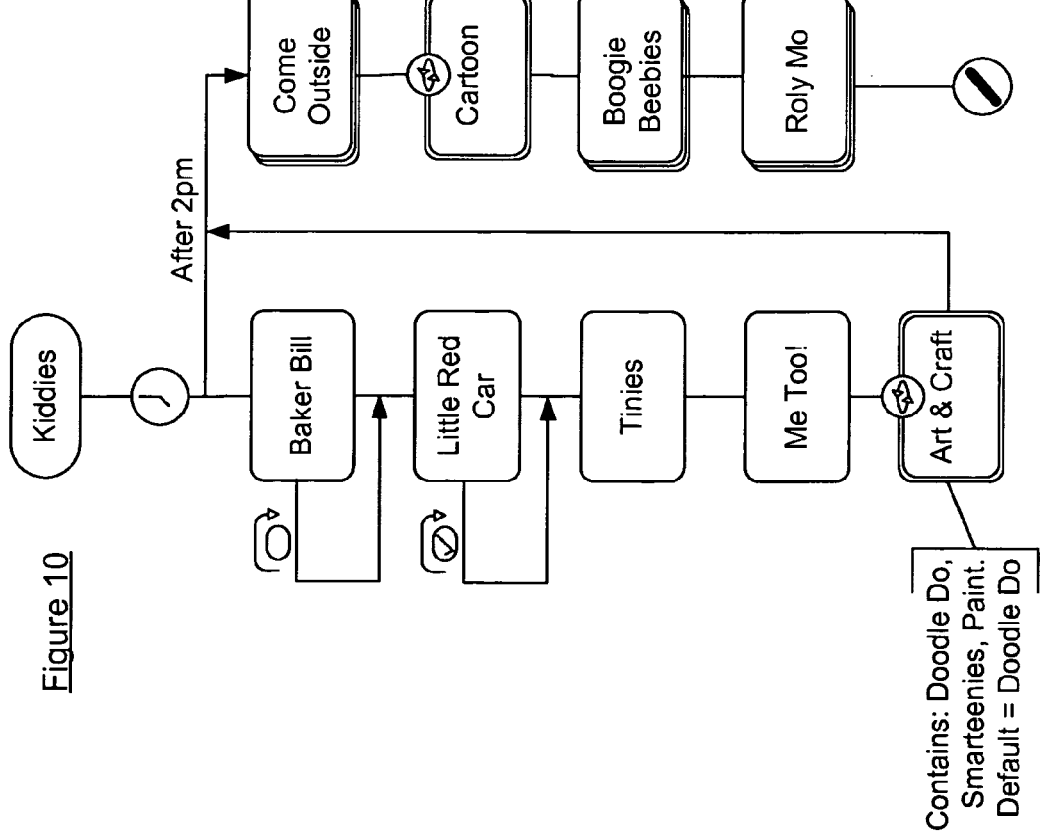

Referring now to FIG. 10, another AdaptiveTV schedule is shown for the "Kiddies" AdaptiveTV channel. In this example, there are two opportunities for the AdaptiveTV schedule to adapt to the viewer's preferences (i.e. follow the most trodden path). Viewer A, who joins the channel before 2 pm, is a new viewer (i.e. has no most trodden path information (e.g. viewing or ditching history) recorded), and is therefore shown Baker Bill, Little Red Car, Tinies, Me Too!, Doodle Do (the default choice from the "Art & Craft" container), Come Outside, Boo (the default choice from the "Cartoon" container), Boogie Beebies, and Roly Mo. Viewer B, who also joins the channel before 2 pm, watches Dom & Merry the most, has recently 'dug' Paint, has recently ditched "Baker Bill" and has already viewed Little Red Car. Viewer B is therefore shown Tinies, Me Too!, Paint, Come Outside, Dom & Merry, Boogie Beebies and Roly Mo.

Figure 11:
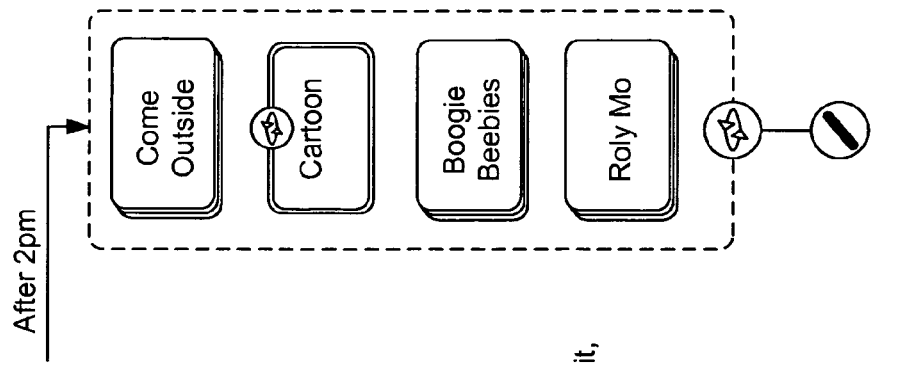

In an alternative embodiment, the "after 2 pm" schedule can be made fully flexible with no imposed order. Rather, the channel scheduler simply includes multiple content items and/or containers within a preference group, as shown in FIG. 11. In such an embodiment, the channel scheduler allows full interpretation of the schedule flow and the viewer's preferences are predominantly relied upon to define the flow.

In the above described embodiments, the AdaptiveTV client device 129 was described as being operable to access state information that enables it to navigate AdaptiveTV schedules. Typically, the state information is stored by the AdaptiveTV client device 129 as describe above. In alternative embodiments, the state information may be stored externally to AdaptiveTV client device 129 (e.g. on a USB dongle). Therefore state information for a particular viewer can be accessed from any AdaptiveTV client device and therefore the state information for that particular viewer is 'portable', i.e. the viewer can take their state information with them and continue their AdaptiveTV experience on an AdaptiveTV client device that is not their own AdaptiveTV client device. Thus the state information is not 'locked' to a single AdaptiveTV client device.

In further embodiments of the present invention, advertisements associated with items of content in an AdaptiveTV schedule can be refined based on the state information stored in the AdaptiveTV client.

A further embodiment of the present invention will now be described with references to FIGS. 12 and 13.

Figure 12:
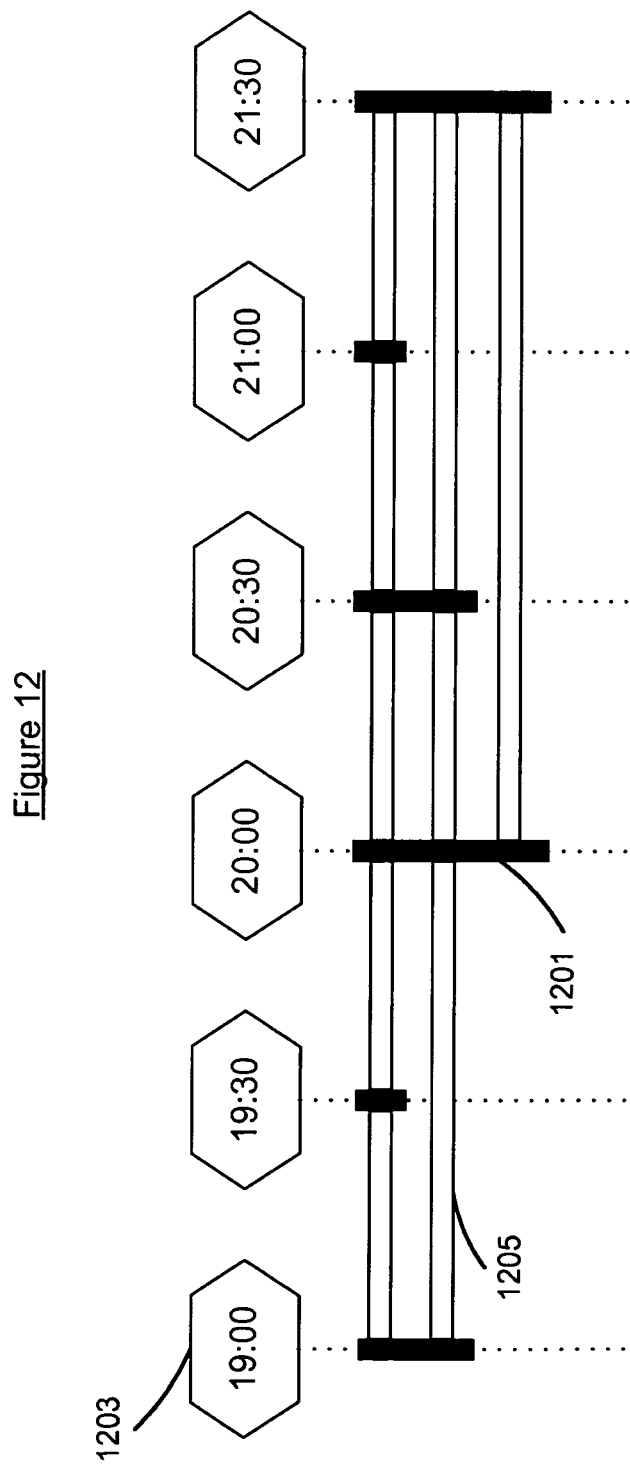
FIG. 12 is an illustration of a television schedule according to embodiments of the present invention.
Figure 13:
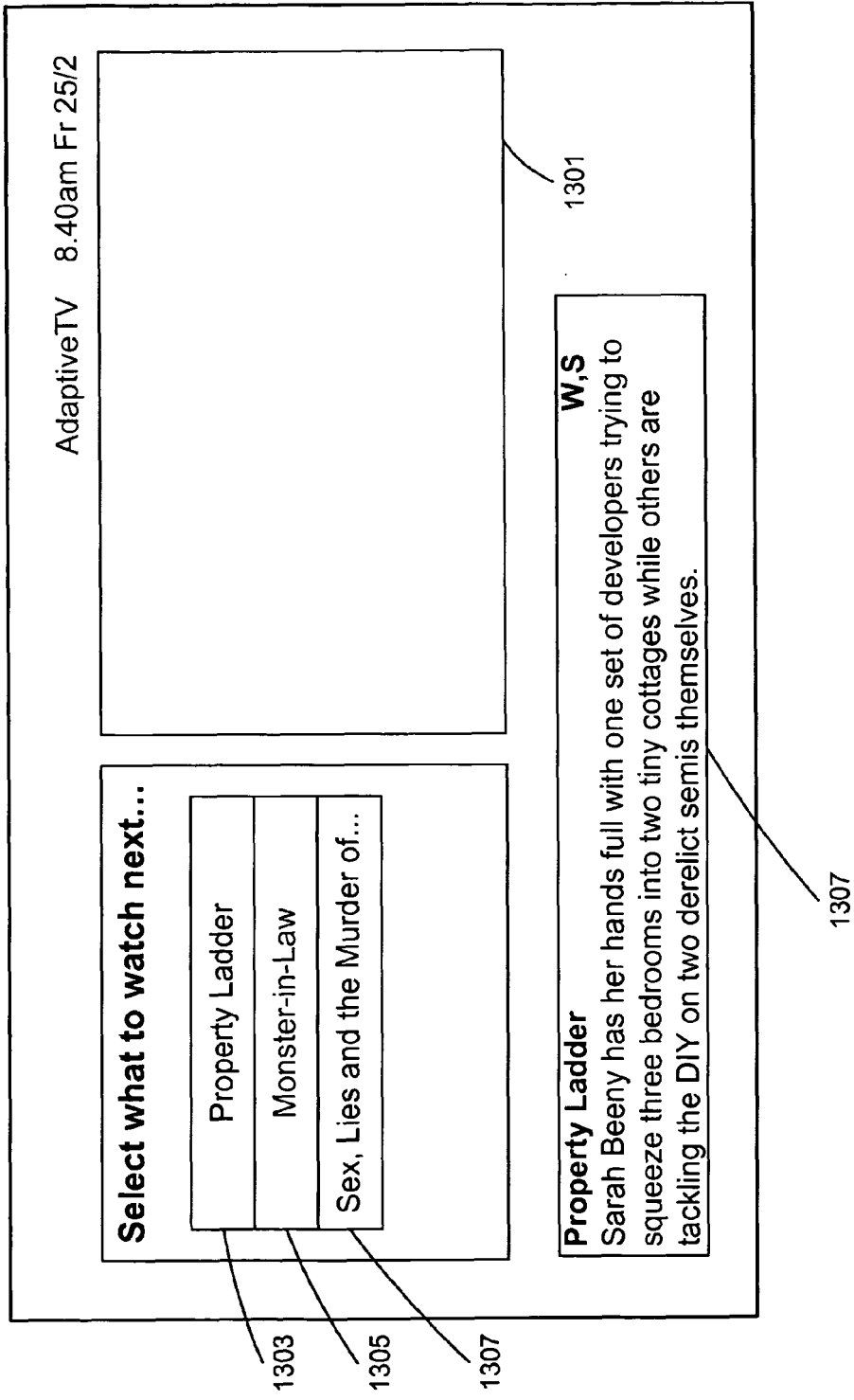
FIG. 13 is an illustration of a user interface presented to a viewer of a television system in accordance with embodiments of the present invention.

Referring to FIG. 12, the AdaptiveTV schedule comprises a graph having nodes 1201 at points in time 1203 at which the AdaptiveTV client evaluates the schedule and presents a set of personal content choices to the viewer. The arcs 1205 (or paths) from the nodes each represent a possible choice of content that the client evaluates and can present to the viewer. The AdaptiveTV schedule may also have specific entry points that determine the choices presentable to a viewer who enters the AdaptiveTV channel at a point in time between schedule nodes.

The AdaptiveTV schedule can be delivered to the AdaptiveTV client ahead of time (typically reflecting a time period in the future), or in chunks (potentially with the granularity of a single node). The AdaptiveTV schedule can also be delivered in response to a client request.

The AdaptiveTV client processes the AdaptiveTV schedule in order to present content to the viewer. At each node of the AdaptiveTV schedule, the AdaptiveTV client typically evaluates the AdaptiveTV schedule in dependence on the following criteria:

Whether the content associated with a particular arc (path) is available to view instantaneously (e.g. from a broadcast, via an on-demand service or from a local cache such as a hard drive accessible to the AdaptiveTV client); and/or A set of simple rules defined by the scheduler that determine a rank (or priority) for each arc/path emanating from the node. This rank will typically be a combination of a fixed score and a variable score determined by previous viewing habits, e.g. whether the viewer has watched episodes of that series recently, or specific items of related content. For example, if a viewer watched a movie then the rank for a documentary about the 'making of' that movie may be given a higher ranking. These scheduler defined rules are conveyed along side each of the choices in the AdaptiveTV Schedule.

The content choices themselves may be static references to a piece of content (e.g. a particular episode in a particular series of a particular program), or a dynamic reference to a piece of content (e.g. the oldest unwatched episode of a particular program, the most recent news bulletin, etc.).

Having evaluated the different content choices at a particular node, the AdaptiveTV client has access to a ranked set of content choices, where the rankings are under the control of the scheduler, and the scheduler controls the influence of the viewers' previous viewing habits on the rankings.

The top n ranked choices (where n is typically limited, to a maximum of four items, for example) are typically presented to the viewer over the end of the previous content item to indicate what will be shown next (typically over the credits) (e.g. as an overlayed on-screen message or as a squeeze back). Referring to FIG. 13, the previous content item being showed to the viewer is 'squeezed back' to a quarter screen 1301. The highest ranked item 1303 (as evaluated by the AdaptiveTV client) will be the default content item that will play once the current content item has finished if the user does nothing. However the viewer is also presented with content options 1305/1307. This is so that if the viewer would rather watch something else, they can choose to do so. Typically, the viewer will not have cause to override the default too often but in seeing the other possible choices of content, the viewer can gain confidence that the AdaptiveTV system is presenting them with their preferred content. A synopsis box 1309 may also be provided to show a synopsis of the highlighted content choice.

Once the viewer starts to watch the next content item (either the default choice or the selected choice), the viewer can easily bring up the interface again to re-explore alternative content choices should they so desire. In such a case, the content choices and/or the ranking of the content choices may have changed based on the criteria described above.

The AdaptiveTV client process the AdaptiveTV schedule in real-time as the viewer watches the content. However, in alternative embodiments, the AdaptiveTV client may process the AdaptiveTV schedule in advance and evaluate the various content choices in advance in order to decide whether to pre-fetch high-ranked content that will not be available instantaneously so it can be presented at the appropriate time in accordance with the schedule. Such an algorithm would balance the rank of the content with the cost of acquiring the content if this were not free to the viewer and/or AdaptiveTV service provider.

In yet further embodiments, the AdaptiveTV schedule (which can be considered as a 'presentation' schedule) may also contain an 'acquisition schedule', which directs the AdaptiveTV client to pre-fetch content that won't be available instantaneously at the point of scheduled presentation.

Although in the above described embodiments a TV channel controller/scheduler was described as constructing the AdaptiveTV schedules, in alternative embodiments, AdaptiveTV schedules could be constructed by end users for the use by other end users. For example, a parent might construct an AdaptiveTV schedule for their children in order to get them to learn something before they start to play games and watch "junk" TV. Using an AdaptiveTV scheduling tool, the parent can build an AdaptiveTV schedule that ensures the kids have done something educational (e.g. by watching some educational content and participating in a quiz on it) before they can play their favourite games or watch cartoons. In another example, an airline operator could construct AdaptiveTV schedules for different types of passengers using in-flight entertainment systems on the airline operator's aircraft.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product; on a tangible medium; or as a signal interpretable by an appropriate computer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. A method of presenting content to a viewer, said method comprising:
   receiving a schedule of content at a client operable by said viewer, said schedule of content comprising a directed graph, said directed graph comprising a plurality of nodes, wherein each of the nodes represents a point in time and any two adjacent nodes in said plurality of nodes are connected directly to each other by at least one path representing content presentable to the viewer, and wherein at least one node in said plurality of nodes is connected directly to a succeeding adjacent node by at least two parallel paths;
   traversing said directed graph by following a route between said nodes and along said paths of said directed graph, wherein said client determines which path, of said at least two parallel paths between said at least one node and said succeeding adjacent node, to follow according to state information accessible by said client; and
   presenting content to said viewer as each path is followed.

2. The method of claim 1, wherein said state information comprises content previously viewed by said viewer.

3. The method of claim 1, wherein said state information further comprises content previously skipped by said viewer.

4. The method of claim 1, wherein said state information further comprises content for which said viewer has expressed satisfaction.

5. The method of claim 1, wherein said state information further comprises content for which said viewer has expressed dissatisfaction.

6. The method of claim 1, wherein said state information further comprises a location of said viewer.

7. The method of claim 1, wherein said state information further comprises at least one of a time and day that content is presented to said viewer.

8. The method of claim 1, further comprising: traversing said directed graph in advance of presenting content to said viewer; identifying content to present to said viewer for each path; and pre-caching identified content.

9. The method of claim 1, wherein content is presented to said viewer by said client requesting unicast delivery of said content from a content playout system.

10. The method of claim 1, wherein content is presented to said viewer by said client tuning to a live broadcast of said content.

11. The method of claim 1, wherein one or more paths represent a choice of content that is presentable to said viewer.

12. The method of claim 11, wherein said choice of content comprises a plurality of content items having a common attribute.

13. The method of claim 1, wherein said state information is stored at said client.

14. The method of claim 1, wherein said state information is stored external to said client.

15. A device for presenting content to a viewer, said device comprising:

- means for receiving a schedule of content at a client operable by said viewer, said schedule of content comprising a directed graph, said directed graph comprising a plurality of nodes, wherein each of the nodes represents a point in time and any two adjacent nodes in said plurality of nodes are connected directly to each other by at least one path representing content presentable to the viewer, and wherein at least one node in said plurality of nodes is connected to a succeeding adjacent node by at least two parallel paths;
- means for traversing said directed graph by following a route between said nodes and along said paths of said directed graph, wherein said client determines which path, of said at least two parallel paths between said at least one node and said succeeding adjacent node, to follow according to state information accessible by said client; and
- means for presenting content to said viewer as each path is followed.

* * * * *

UNITED STATES PATENT AND TRADEMARK OFFICE
CERTIFICATE OF CORRECTION

PATENT NO. : 8,819,735 B2
APPLICATION NO. : 12/452158
DATED : August 26, 2014
INVENTOR(S) : Rai et al.

Page 1 of 1

It is certified that error appears in the above-identified patent and that said Letters Patent is hereby corrected as shown below:

In the Specification

In column 22, line 3, delete "''Skipable t Never Allowed''" and substitute therefor --"Skipable ≠ Never Allowed"--.

In column 28, line 24, delete "If 'Tithes' has not been viewed then 'Tithes' is" and substitute therefor --If 'Tinies' has not been viewed then 'Tinies' is--.

Signed and Sealed this
Eleventh Day of November, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,819,735 B2 | Page 1 of 1 |
| APPLICATION NO. | : 12/452158 | |
| DATED | : August 26, 2014 | |
| INVENTOR(S) | : Rai et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 989 days.

Signed and Sealed this
Twenty-fourth Day of May, 2016

Michelle K. Lee
*Director of the United States Patent and Trademark Office*